United States Patent
Lange et al.

(10) Patent No.: US 8,742,053 B2
(45) Date of Patent: Jun. 3, 2014

(54) POLYAMIDE-POLYSILOXANE COMPOUNDS

(75) Inventors: Horst Lange, Bochum (DE);
Karl-Heinz Sockel, Leverkusen (DE);
Roland Wagner, Bonn (DE); Gunnar Hoffmüller, Leverkusen (DE)

(73) Assignee: Momentive Performance Materials GmbH, Leverkusen (DE)

( * ) Notice: Subject to any disclaimer, the term of this patent is extended or adjusted under 35 U.S.C. 154(b) by 837 days.

(21) Appl. No.: 12/531,512

(22) PCT Filed: Mar. 19, 2008

(86) PCT No.: PCT/EP2008/053311
§ 371 (c)(1), (2), (4) Date: Oct. 26, 2009

(87) PCT Pub. No.: WO2008/113831
PCT Pub. Date: Sep. 25, 2008

(65) Prior Publication Data
US 2010/0044615 A1  Feb. 25, 2010

(30) Foreign Application Priority Data
Mar. 19, 2007 (DE) ......................... 10 2007 012 908

(51) Int. Cl.
*C08G 18/80* (2006.01)
*C08F 283/12* (2006.01)
*C08G 77/455* (2006.01)

(52) U.S. Cl.
USPC .............................. 528/45; 525/474

(58) Field of Classification Search
USPC .............................. 528/45; 525/474
See application file for complete search history.

(56) References Cited

U.S. PATENT DOCUMENTS

| | | | | |
|---|---|---|---|---|
| 3,055,845 | A * | 9/1962 | Merten et al. | 521/113 |
| 4,902,767 | A * | 2/1990 | Roitman et al. | 528/28 |
| 5,738,912 | A * | 4/1998 | Konig et al. | 427/389 |
| 6,827,875 | B2 * | 12/2004 | Schelhaas et al. | 252/182.2 |
| 7,026,429 | B2 * | 4/2006 | Gertzmann et al. | 528/45 |
| 7,553,906 | B2 * | 6/2009 | Weikard et al. | 525/174 |
| 7,998,529 | B2 * | 8/2011 | Cheng | 427/384 |
| 2004/0147704 | A1 | 7/2004 | Detig-Karlou et al. | |
| 2005/0020769 | A1 | 1/2005 | Lu et al. | |
| 2005/0176883 | A1 * | 8/2005 | Gertzmann et al. | 524/839 |
| 2006/0036055 | A1 | 2/2006 | Schafer et al. | |
| 2009/0076238 | A1 | 3/2009 | Lange et al. | |

OTHER PUBLICATIONS

International Search Report for corresponding PCT/EP2008/053311 mailed Aug. 18, 2008, three pages.
International Preliminary Report on Patentability for corresponding PCT/EP2008/053311 mailed Oct. 15, 2009, six pages.

* cited by examiner

*Primary Examiner* — Mike M Dollinger
(74) *Attorney, Agent, or Firm* — Rankin, Hill & Clark LLP

(57) ABSTRACT

The invention relates to novel polyamide-polysiloxane compounds, processes for their preparation, their use, precursors for their preparation and reactive compositions which contain the precursors.

17 Claims, No Drawings

POLYAMIDE-POLYSILOXANE COMPOUNDS

The invention relates to novel polyamide-polysiloxane compounds, processes for their preparation, their use, precursors for their preparation and reactive compositions which contain the precursors.

It is widely known to react hydrocarbon-based diisocyanates with hydrocarbon-based diamines or hydrocarbon-based diols to give polyureas or polyurethanes. The incorporation of isocyanates, amines or alcohols of higher functionality leads to crosslinked product.

An essential aspect of the preparation of such polymers is the provision of storage-stable prepolymers which can be easily handled. This is preferably achieved by temporary deactivation of isocyanate-containing prepolymers with suitable blocking agents, such as lactams, oximes, pyrazoles, sterically hindered amines or malonic acid esters (C. Gürtler, M. Homann, M. Mager, M. Schelhaas, T. Stingl, Farbe & Lack, volume 110, 12/2004, 34-37). A disadvantage of these blocking strategies is that under the conditions of the formation of the final polyureas or polyurethanes, volatile cleavage products originating from the blocking agents are liberated.

To overcome this disadvantage, blocking agents which are based on cyclic ketones and are bonded into the final polymer have been developed. By this procedure, cleavage products are not liberated.

U.S. Pat. No. 6,827,875 thus describes the reaction of cyclic ketones, preferably cyclopentanone-2-carboxyethyl ester (CPEE), with diisocyanates to give reactive precondensates, which react with hydrocarbons containing hydroxyl groups or amino groups to give the final polymers, with the formation of ester or amide bonds. US 2004/0030086 discloses polyester polyols, polycarbonate polyols and polyacrylate polyols as polyhydroxy compounds for lacquer uses. US 2004/0147704 proposes specifically the use of isocyanate-modified polyethers in combination with hydrocarbons containing amino groups for systems which cure at room temperature.

According to US 2006/0069255, the reactivity of the system can be controlled by using amino alcohols in the last polymerization stage. US 2004/0133035 deals with the use of curing agent powders for the preparation of solvent-free lacquers. According to US 2004/0132909, acrylate monomers can be added to the prepolymers which are free from cleavage products, and these are then radiation-crosslinkable.

It is a common disadvantage of the proposals mentioned that they give no indications of the introduction of the desired polyorganosiloxane segments.

Siloxane block copolymers containing quaternary ammonium structures are widely known. These can be on the one hand di-block copolymers of the type of siloxane with quaternary ammonium units (DE 33 40 708, EP 282720, U.S. Pat. No. 6,240,929, U.S. Pat. No. 6,730,766). On the other hand, tri-block copolymers which are based on the combination of siloxane, quaternary ammonium unit and polyether block have been developed (WO 02/10256, WO 02/10257, WO 02/10259, WO 2004/090007, WO 03/078504, WO 2004/041912, WO 2004/042136).

GB 1128642 describes the reaction of amino- or hydroxy-terminated siloxanes with diisocyanates, it being possible for ionic groups, e.g. quaternary ammonium groups, to be introduced simultaneously or subsequently.

The reaction of amino- or hydroxy-terminated siloxanes with diisocyanates leads to isocyanate-terminated intermediate stages, which then react, for example, with primary-tertiary di- or triamines, after which the tertiary amino group is quaternized. It is possible to react the isocyanate-terminated intermediate stages with oligoethylene glycols as hydrophilic chain-lengthening agents, but this leads to a consumption of isocyanate groups, which are then no longer available for the reaction with primary-tertiary diamines. The amount of quaternary ammonium groups which can be introduced consequently drops. A disadvantage of this solution is thus that flexible, wide-ranging adaptation of the structure to the concrete product requirements cannot take place.

It is furthermore known to react siloxanes terminated with amino groups with hydrocarbon-based diisocyanates to give di-block copolymers containing urea groups (US 2006/036055 und Silicone, Chemie und Technologie, Vulkan Verlag Essen 1989, p. 94-96). Analogous urethane derivative are likewise described (US 2004/087752).

Reaction of OH-terminated polyethers, polyesters or polyurethanes with isocyanatosilanes which condense under use conditions in the presence of moisture to give siloxane networks is likewise prior art (DE 103 28 844, DE 103 30 288, US 2004/087752).

These proposals aimed at the introduction of siloxane structures into block copolymers have two essential disadvantages. Either high molecular weight materials with corresponding properties, such as high viscosities, must already be employed by the end user, which requires appropriate machine technology, or materials with alkoxysilane groupings are employed, the on-site formation of the polymers being linked to the presence of water, which in many cases is undesirable and can be designed reproducibly only with difficulty. The rigid T-siloxane networks (T=R—SiO$_{3/2}$) formed are unsuitable for establishing a defined siloxane character of the final polymers.

It was therefore an object of the invention to provide block copolymers with involvement of siloxane-containing segments, which can react from storage-stable precursors to give the desired polymers in a targeted manner when used.

A further object of the invention was to provide siloxane block copolymers containing quaternary ammonium groups, which on the one hand allow an adaptation of the structure to the concrete product requirements within wide limits, and in which on the other hand essential product properties can be influenced under the influence of donor-acceptor interactions by amide, urea and urethane groups.

The present invention provides novel polyamide-polysiloxane compounds which can react from stable precursors to give the desired polyamide-polysiloxane compounds in a targeted manner when used. The novel polyamide-polysiloxane compounds can be prepared easily, reliably and in a targeted manner and have novel interesting properties.

The invention relates to novel polyamide-polysiloxane compounds containing at least one structural element of the formula (1):

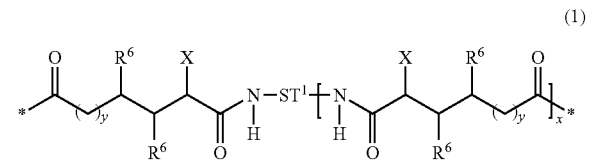

wherein
* symbolizes a free valency,
X is an electron-attracting group,
the radicals $R^6$ can be identical or different and are chosen from hydrogen and straight-chain, cyclic or branched, saturated, unsaturated or aromatic hydrocarbon radicals having up to 40 carbon atoms, which can contain one or more groups chosen from —O—, —C(O)—, —NH— and —NR$^3$—, wherein
  $R^3$ is a straight-chain, cyclic or branched, saturated, unsaturated or aromatic hydrocarbon radical having up to 40 carbon atoms, which can contain one or more groups chosen from —O—, —C(O)— and —NH—, and wherein the radicals $R^6$ are preferably hydrogen, $ST^1$ is a di- to tetravalent, straight-chain, cyclic or branched, saturated, unsaturated or aromatic hydrocarbon radical having up to 1,000 carbon atoms, which can contain one or more groups chosen from —O—, —C(O)—, —NH—, —$NR^3$— and a polysiloxane unit having 2 to 1,000 silicon atoms, wherein $R^3$ is as defined above, y is from 0 to 5, and is preferably 1, and x is from 1 to 3, and is preferably 1 or 2, or acid addition compounds thereof.

According to the invention, the term acid addition compounds means in particular salt-like compounds which are obtained by protonation of basic groups in the molecule, such as, in particular, amino groups optionally present, for example by reaction with inorganic or organic acids.

The polyamide-polysiloxane compounds of the invention can be linear or branched in structure. If x is >1, branched structures are obtained. The invention includes in particular having only linear structures (x=1) and both linear and branched structures (x=1 and x>1) present in the compounds.

The polysiloxane structural element obligatorily present in the polyamide-polysiloxane compounds according to the invention preferably has the formula (2):

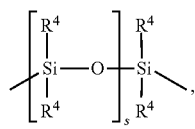

(2)

wherein $R^4$ is a straight-chain, cyclic or branched, saturated, unsaturated or aromatic hydrocarbon radical having up to 20 C atoms, and s=1 to 999, preferably 1 to 199, more preferably 1 to 99, wherein at least one of the groups $ST^1$, $ST^2$ or $ST^4$ contains the polyorganosiloxane radical of the formula (2).

The polyamide-polysiloxane compounds according to the invention contain on average preferably at least two structural elements of the formula (1).

The polyamide-polysiloxane compounds according to the invention furthermore contain on average least two, preferably at least three polysiloxane structural elements of the formula (2).

The polyamide-polysiloxane compounds according to the invention furthermore preferably contain at least one, more preferably at least two, still more preferably at least three recurring units of the formula (3):

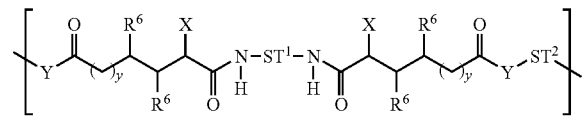

(3)

wherein

X, $R^6$, $ST^1$ and y are as defined above, and

Y is chosen from —O—, —S— and —$NR^2$—, wherein $R^2$ is hydrogen or a straight-chain, cyclic or branched, saturated, unsaturated or aromatic hydrocarbon radical having up to 40 carbon atoms, which can contain one or more groups chosen from —O—, —C(O)—, —NH— and —$NR^3$—, wherein $R^3$ is as defined above, and $ST^1$ is a straight-chain, cyclic or branched, saturated, unsaturated or aromatic hydrocarbon radical having up to 1,000 carbon atoms, which can contain one or more groups chosen from —O—, —C(O)—, —NH—, —$NR^3$—,

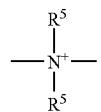

and a polysiloxane unit having 2 to 1,000 silicon atoms, wherein $R^5$ is a straight-chain, cyclic or branched, saturated, unsaturated or aromatic hydrocarbon radical having up to 100 carbon atoms, which can contain one or more groups chosen from —O—, —C(O)— and —NH—, or $R^5$ is a divalent radical which forms cyclic structures within the radical $ST^2$, or Y is nitrogen and together with $ST^2$ forms a heterocyclic structure, which results in particular from the use of cyclic diamines, such as piperazine, so that —Y-$ST^2$-Y— has, for example, the following structure:

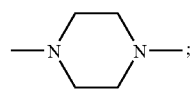

in this context, this variant also includes the case where the heterocyclic structure contains only one radical Y, so that —Y-$ST^2$-Y— has, for example, the following structure, i.e. piperidine derivatives:

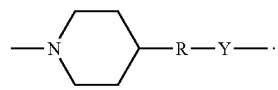

In the polyamide-polysiloxane compounds according to the invention, the electron-attracting group X is preferably chosen from —Z—$R^1$, wherein $R^1$ is a straight-chain, cyclic or branched, saturated, unsaturated or aromatic hydrocarbon radical having up to 40 carbon atoms, which can contain one or more groups chosen from —O—, —C(O)—, —NH— and —$NR^3$—, wherein $R^3$ is as defined above, and wherein Z is chosen from —C(O)—O—, —$SO_2$—, —$NO_2$, —P(O)($OR^4$)$_2$, —CN, —NC, and —C(O)—.

Particularly preferably, X represents an ester radical of the formula —C(O)—O—$R^1$, wherein $R^1$ is as defined above, and most preferably X is chosen from a carboxylic acid methyl ester group and a carboxylic acid ethyl ester group.

In the polyamide-polysiloxane compounds according to the invention, $R^6$ preferably represents hydrogen.

In a preferred embodiment, the invention relates to linear polyamide-polysiloxane compounds wherein x=1. Such linear polyamide-polysiloxane compounds of the invention are preferably used in those uses where a good miscibility or dispersibility in aqueous media is required. Such uses include, in particular, use as softeners for fibres, in particular in detergents, textile care compositions and textile finishing compositions, and modifying agents for thermoplastics.

In a further preferred embodiment, the invention relates to branched polyamide-polysiloxane compounds wherein x=1 and x is >1. Such polyamide-polysiloxane compounds of the invention containing branched structural elements are required in particular for those uses where thermosetting coatings or elastomers are prepared from the polyamide-polysiloxane compounds of the invention.

In a further embodiment of the polyamide-polysiloxane compounds according to the invention, these contain amino groups, protonated amino groups and/or quaternary ammonium groups. The presence of quaternary ammonium groups, which serves in particular to establish hydrophilic or substantive properties, such as are advantageous in particular in use in aqueous compositions, is particularly preferred.

Particularly preferred polyamide-polysiloxane compounds of the invention contain one, but in particular also several recurring units of the following formulae:

$ST^2$ is a divalent straight-chain, cyclic or branched, polyvalent, saturated, unsaturated or aromatic hydrocarbon radical having up to 200 carbon atoms, which can contain one or more groups chosen from —O—, —C(O)—, —NH—, —NR$^3$—,

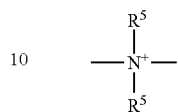

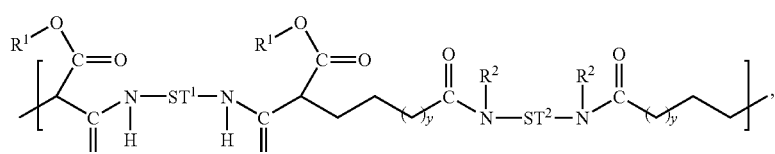

(4)

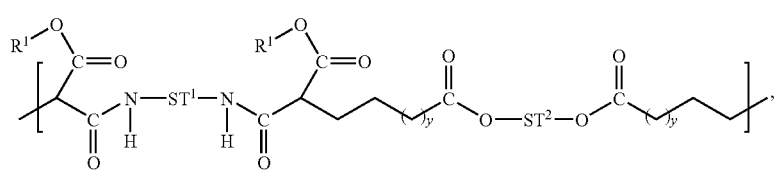

(5)

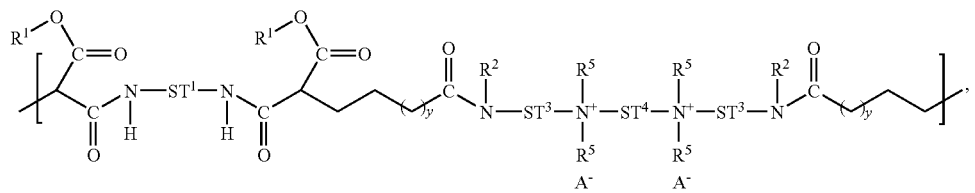

(6)

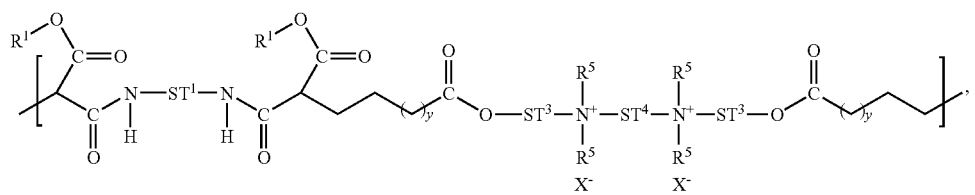

(7)

wherein $R^1$, $ST^1$, $ST^1$, $R^2$, $R^5$ and y are as defined above,
$ST^3$ is a straight-chain, cyclic or branched, saturated, unsaturated or aromatic hydrocarbon radical having 2 to 100 carbon atoms, which can contain one or more groups chosen from —O—, —C(O)—, —NH— and —NR$^3$—, and
$ST^4$ is a straight-chain, cyclic or branched, saturated, unsaturated or aromatic hydrocarbon radical having up to 1,000 carbon atoms, which can contain one or more groups chosen from —O—, —C(O)—, —NH—, —NR$^3$— and a polysiloxane unit having 2 to 1,000 silicon atoms, and
$A^-$ is an inorganic or organic anion.

Preferred polyamide-polysiloxane compounds of the invention have one or more or all of the following preferred definitions:
$ST^1$ is a divalent straight-chain, cyclic or branched, polyvalent, saturated, unsaturated or aromatic hydrocarbon radical having up to 200 carbon atoms, which can contain one or more groups chosen from —O—, —C(O)—, —NH—, —NR$^3$— and a polysiloxane unit having 2 to 200 silicon atoms, and a polysiloxane unit having 2 to 200 silicon atoms,
$R^2$ is H or a straight-chain, cyclic or branched, saturated, unsaturated or aromatic hydrocarbon radical having up to 10 carbon atoms, which can contain one or more groups chosen from —O—, —C(O)—, —NH— and —NR$^3$—,
  y is 0 to 3,
$ST^4$ is a divalent, straight-chain, cyclic or branched, polyvalent, saturated, unsaturated or aromatic hydrocarbon radical having up to 200 carbon atoms, which can contain one or more groups chosen from —O—, —C(O)—, —NH—, —NR$^3$— and a polyorganosiloxane unit having 2 to 200 silicon atoms,
  wherein at least one of the groups $ST^1$, $ST^2$ or $ST^4$ contains the polyorganosiloxane radical of the formula (2).
$ST^3$ is a straight-chain, cyclic or branched, polyvalent, saturated, unsaturated or aromatic hydrocarbon radical having 2 to 20 carbon atoms, which can contain one or more groups chosen from —O—, —C(O)—, —NH— and —NR$^3$,
$R^3$ is a straight-chain, cyclic or branched, saturated, unsaturated or aromatic hydrocarbon radical having up to 10 carbon atoms, which can contain one or more groups chosen from —O—, —C(O)— and —NH—, $R^4$ is a straight-chain, cyclic or branched, saturated, unsaturated or aromatic hydrocarbon radical having up to 9 carbon atoms, $R^5$ is a straight-chain, cyclic or branched, saturated, unsaturated or aromatic hydrocarbon radical having up to 25 carbon atoms, which can contain one or more groups chosen from —O—, —C(O)— and —NH—, or $R^5$ is a divalent radical which forms cyclic structures within the radical $ST^2$, $R^6$ is hydrogen, $A^-$ is chosen from halide, such as chloride or bromide, sulfate, phosphate, carboxylate, alkyl sulfate and sulfonate.

In a preferred embodiment of the invention the radical $ST^1$ is chosen from:

divalent, straight-chain hydrocarbon radicals having up to 15 carbon atoms, such as, for example, hexamethylene, divalent, cyclic hydrocarbon radicals having up to 15 carbon atoms, such as, for example,

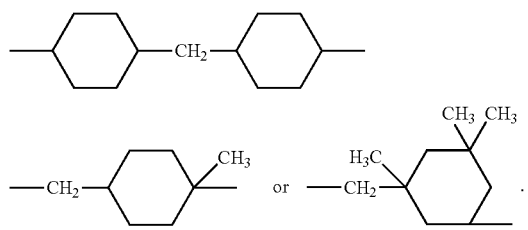

divalent, aromatic hydrocarbon radicals having up to 15 carbon atoms, such as, for example, based on 2,4-toluoyl, 2,6-toluoyl, bis-phenyl-methane and naphthylene structures of the formulae:

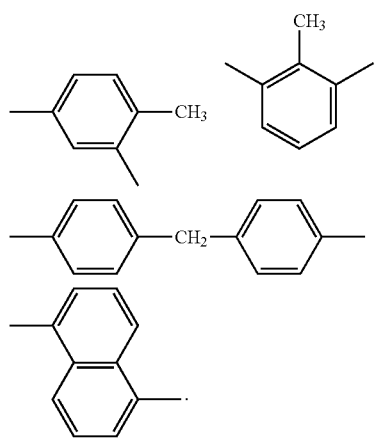

$ST^1$ comprises in particular structures which on the one hand are derived directly from isocyanates which are difunctional or of higher functionality. Particularly preferred difunctional structures are divalent, straight-chain hydrocarbon radicals having up to 15 carbon atoms, for example hexamethylene, divalent, cyclic hydrocarbon radicals having up to 15 carbon atoms, for example based on bis-cyclohexylmethane structures

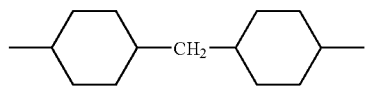

divalent, branched hydrocarbon radicals having up to 15 carbon atoms, for example based on methylcyclohexyl or isophorone structures

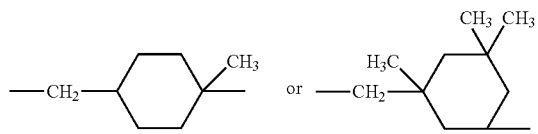

divalent, aromatic hydrocarbon radicals having up to 15 carbon atoms, for example based on 2,4-toluoyl, 2,6-toluoyl, bis-phenyl-methane and naphthylene structures

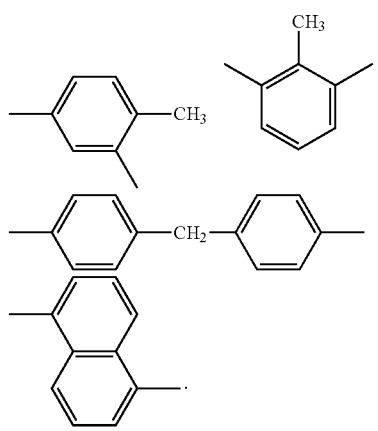

Correspondingly particularly preferred starting materials among the diisocyanates are hexamethylene-diisocyanate, isophorone-diisocyanate, bis-(4-isocyanato-cyclohexyl)-methane, toluoylene-2,4-diisocyanate, toluoylene-2,6-diisocyanate, bis-(4-isocyanato-phenyl)methane, naphthylene-1, 5-diisocyanate, 1,3-diisocyanato-4-methylcyclo-hexane, 5-methyl-1,9-diisocyanatononane, 2,4-dimethyl-1,8-diisocyanatooctane, 2-methyl-1,5-diisocyanatopeniane and 2-ethyl-1,4-diisocyanatobutane.

It is furthermore within the context of the invention to employ uretdione substructures, diisocyanates containing the following unit

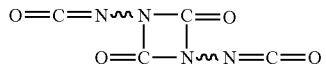

An example of these is isophorone-diisocyanate dimer. These starter molecules are obtained by dimerization of corresponding, preferably diisocyanates (H. J. Laas, R. Halpaap, J. Pedain, Journal f. Prakt. Chemie 336 [1994], 185-200; H. J. Laas, R. Halpaap, J. Pedain, Farbe+Lack 100 [1994], 330-336).

It is furthermore within the context of the invention to employ isocyanates of higher functionality for formation of the hydrocarbon radical $ST^1$, Examples are tris-(4-isocyanatophenyl)-methane (Desmodur® R, Bayer AG), the reaction product of trimethylolpropane and toluoylene-2,4-diisocyanate/toluoylene-2,6-diisocyanate (Desmodur® L, Bayer AG) and the trimerization product of hexamethylene-diisocyanate (Desmodur® N3400, Bayer AG).

In another preferred embodiment, the hydrocarbon radicals $ST^1$ are more complex structures which are derived from α,ω-isocyanate-functionalized prepolymers.

These α,ω-isocyanate-functionalized prepolymers are preferably the reaction products of
  diols with diisocyanates,
  OH-terminated polyethers, preferably ethylene oxide- and propylene oxide-based polyethers, with diisocyanates,
  OH-terminated polyesters with diisocyanates,
  OH-terminated polycarbonates with diisocyanates,
  OH-terminated polyacrylates with diisocyanates.

Details of such prepolymers containing urethane bridges can be found in US 2004/0030086 and US 2006/0069255. Alternatively, it is possible to produce the α,ω-isocyanate-functionalized prepolymers by reaction of diamines with diisocyanates. These α,ω-isocyanate-functionalized prepolymers are preferably the reaction products of
  diamines with diisocyanates,
  NH- or $NH_2$-terminated polyethers, preferably ethylene oxide- and propylene oxide-based polyethers, with diisocyanates,
  $NH_2$-terminated polyamides with diisocyanates,
  $NH_2$-terminated ureas with diisocyanates, Examples of commercially available amino-terminated polyethers are the Jeffamines® of the ED series (Huntsman Corp.).

The introduction according to the invention of siloxane blocks into $ST^1$ is preferably carried out via α,ω-isocyanate-functionalized prepolymers. These siloxane-containing α,ω-isocyanate-functionalized prepolymers are preferably prepared by reaction of
  α,ω-aminoalkyl-terminated siloxanes with disocyanates,
  α,ω-hydroxyalkyl-terminated siloxanes with diisocyanates,
  α,ω-polyether-terminated siloxanes with diisocyanates and
  α,ω-epoxy-terminated siloxanes with diisocyanates.

The preparation of the corresponding α,ω-aminoalkyl-terminated siloxanes, α,ω-hydroxyalkyl-terminated siloxanes, α,ω-polyether-terminated siloxanes and α,ω-epoxy-terminated siloxanes is prior art (Silicone, Chemie und Technologie, Vulkan Verlag Essen 1989, p. 85-90 and 120).

It is furthermore within the context of the invention to employ siloxane-based isocyanate prepolymers of higher functionality for formation of the hydrocarbon radical $ST^1$.

For synthesis thereof, the comb-like- or α,ω-terminated and comb-like-, aminoalkyl-, hydroxyalkyl-, polyether- or epoxy-substituted siloxanes known from the prior art are reacted with diisocyanates.

It is within the context of the invention optionally to catalyse the formation of the isocyanate-terminated prepolymers. Suitable catalysts are e.g. tin(II) octoate, dibutyltin(II) laurate, tertiary amines, such as triethylamine, and DABCO (US 2004/0147744).

For introduction of the structural element

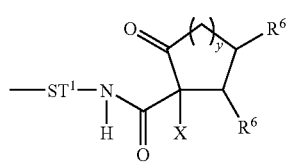

(8)

the isocyanate-terminated prepolymers dealt with above are reacted with substituted CH-acid cyclic ketones of the prior art (U.S. Pat. No. 6,827,875).

Preferred cyclic ketones are cyclopentanone-2-carboxymethyl ester (CPME) and cyclopentanone-2-carboxyethyl ester (CPEE).

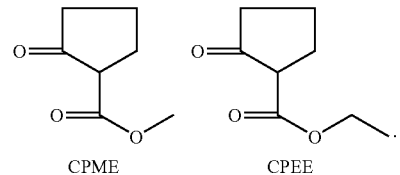

CPME            CPEE

This reaction can optionally proceed in the presence of catalysts. Suitable catalysts are, inter alia, sodium carbonate, amines, such as DABCO, and zinc salts, such as zinc(II) ethylhexanoate (US 2004/0147704).

As a result of the reaction, blocked intermediates containing $ST^1$ are formed. These intermediates can be reacted with suitable partners containing $ST^2$.

In the case of non-quaternized block copolymers, in a preferred embodiment the partners containing $ST^2$ are hydrocarbon-based α,ω-hydroxy- or amino-functionalized substances.

They are preferably
  hydrocarbon diols,
  OH-terminated polyethers, preferably ethylene oxide- and propylene oxide-based polyethers,
  OH-terminated polyesters,
  OH-terminated polycarbonates and
  OH-terminated polyacrylates.

Alternatively, they are substances carrying primary and/or secondary amino groups, preferably
  hydrocarbon diamines,
  amino alcohols, such as ethanolamine,
  NH- or $NH_2$-terminated polyethers, preferably ethylene oxide- and propylene oxide-based polyethers,
  $NH_2$-terminated polyamides,
  $NH_2$-terminated ureas.

Examples of commercially available amino-terminated polyethers are the Jeffamines® of the ED series (Huntsman Corp.).

In a further preferred embodiment, the hydrocarbon radicals $ST^2$ are more complex structures which are derived from α,ω-hydroxy-functionalized prepolymers. These α,ω-hydroxy-functionalized prepolymers are preferably the reaction products of
  diols with diisocyanates,
  OH-terminated polyethers, preferably ethylene oxide- and propylene oxide-based polyethers with diisocyanates,
  OH-terminated polyesters with diisocyanates,
  OH-terminated polycarbonates with diisocyanates,
  OH-terminated polyacrylates with diisocyanates.

Alternatively, it is possible to produce the α,ω-amino-functionalized prepolymers containing primary and/or secondary amino groups by reaction of diamines with diisocyanates.

These α,ω-amino-functionalized prepolymers are preferably the reaction products of
  diamines with diisocyanates,
  NH- or $NH_2$-terminated polyethers, preferably ethylene oxide- and propylene oxide-based polyethers, with diisocyanates,
  $NH_2$-terminated polyamides with diisocyanates,
  $NH_2$-terminated ureas with diisocyanates, Examples of commercially available amino-terminated polyethers are the Jeffamines® of the ED series (Huntsman Corp.).

In the case of non-quaternized block copolymers, the introduction according to the invention of siloxane blocks into $ST^2$ is preferably carried out via
- α,ω-aminoalkyl-terminated siloxanes containing primary and/or secondary amino groups,
- α,ω-hydroxyalkyl-terminated siloxanes,
- α,ω-polyether-terminated siloxanes The preparation of the α,ω-aminoalkyl-terminated siloxanes, α,ω-hydroxyalkyl-terminated siloxanes and α,ω-polyether-terminated siloxanes being introduced into $ST^2$ is described in the prior art (Silicone, Chemie und Technologie, Vulkan Verlag Essen 1989, p. 85-90 and 120).

In a further embodiment, siloxane blocks are introduced into $ST^2$ via α,ω-hydroxy-functionalized or α,ω-$NH_2$— or NH-functionalized prepolymers.

These siloxane-containing prepolymers are preferably prepared by reaction of
- α,ω-aminoalkyl-terminated siloxanes with diisocyanates,
- α,ω-hydroxyalkyl-terminated siloxanes with diisocyanates,
- α,ω-polyether-terminated siloxanes with diisocyanates.

It is furthermore within the context of the invention to employ hydrocarbon-based or siloxane-based substances of higher functionality for formation of the radical $ST^2$. These materials contain more than two hydroxyl or primary and/or secondary amino functions.

Examples of hydrocarbon-based substances of higher functionality are glycerol, pentaerythritol, sorbitol, the ethoxylates of the alcohols of higher functionality mentioned, tris(2-aminoethyl)-amine and the $NH_2$-terminated alkoxylates of the T-Jeffamine series (Huntsman Corp.).

Suitable siloxane-based substances of higher functionality with α,ω and/or comb-like hydroxyl substitution can be obtained, for example, by addition of allyl alcohol, butynediol and the alkoxylates of allyl alcohol or butynediol on to corresponding SiH-siloxanes.

Further suitable siloxane-based substances of higher functionality with α,ω and/or comb-like $NH_2$ and/or NH substitution contain, for example, aminopropyl and aminoethylaminopropyl units. Suitable units can furthermore be obtained by opening epoxide structures with $NH_3$ or primary amines.

It is an essential feature that the functionality of these hydrocarbon-based or siloxane-based substances of higher functionality is greater than/equal to 3.

The reactions of the blocked prepolymers with the amino- or hydroxy-functional precursors forming the $ST^2$ unit are preferably carried out in the range of from room temperature to 160° C., preferably to 140° C. The reaction times are a few minutes to some hours.

It is within the context of the invention optionally to catalyse the reaction of the prepolymers which are blocked with cyclic ketones and contain the groups of the formula (8) containing $ST^1$ with the amino- or hydroxy-functional precursors forming $ST^2$. Suitable catalysts are e.g. dibutyltin dilaurate, zinc 2-ethylhexanoate and bismuth 2-ethylhexanoate (U.S. Pat. No. 6,827,875).

The reaction times, the reaction temperatures, the use of catalysts and the conversion achieved depend in particular on the type of amino and hydroxyl groups on the precursors forming $ST^2$. Generally, primary amino groups react more readily than secondary amino groups. The reaction of hydroxyl groups often additionally requires the presence of a catalyst.

It is within the context of the invention to carry out the entire reaction sequence or individual part steps without a solvent or in the presence of solvents. Preferred solvents are typical lacquer solvents, such as methoxypropyl acetate, butyl acetate and toluene.

As a result of the total reaction sequence shown, polyamide or polyamide-polyester block copolymers which have siloxane units at least in one of the structural elements $ST^1$ and/or $ST^2$ are obtained.

The invention furthermore relates to processes for the preparation of the polyamide-polysiloxane compounds according to the invention.

According to a first variant, a compound of the formula $$\begin{array}{c}(9)\end{array}$$

wherein x, y, X, $R^6$ and $ST^1$ are as defined above,
is reacted with a compound of the formula H—Y-$ST^2$-Y—H, wherein Y and $ST^2$ are as defined above, with the proviso that at least one of the radicals $ST^1$ and/or $ST^2$ comprises a polysiloxane radical, optionally in a solvent and optionally in the presence of a catalyst.

Depending on the radical Y used (—O—, —S— and —$NR^2$—), ester, thioester and/or amide groups are formed in the ring opening.

The use of compounds in which x is >1 of course leads to the formation of branched structures. According to the invention, the introduction of branched structures is also possible by using polyfunctional compounds of the type H—Y-$ST^2$-(Y—H)$_x$ wherein x is >1.

In a second variant of the process according to the invention, the compound of the formula $$\begin{array}{c}(9)\end{array}$$

wherein x, y, X, $R^6$ and $ST^1$ are as defined above,
is reacted with a compound of the formula

H$Y^2$-$ST^3$-$NR^5_2$, wherein $ST^3$, $Y^2$ and $R^5$ are as defined above,
and a compound of the formula

Q-$ST^{4V}$-Q, wherein
Q is a radical which is capable of alkylation of an amino group, and $ST^{4V}$, together with the molecular part originating from Q after the quaternization reaction, forms the radical $ST^4$,
with the proviso that at least one of the radicals $ST^1$, $ST^3$ and/or $ST^4$ comprises a polyorganosiloxane radical.

The use of the "asymmetric" compounds of the formula

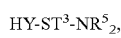

serves in particular in this variant to effect the ring opening of the cyclic ketone via the radical HY—, while the radical —NR$^5_2$ preferentially undergoes the alkylation.

In this variant, R$^5$ expediently is not hydrogen, since the radical —NR$^5_2$ is otherwise also capable of opening the cyclic ketone, and the resulting amide is no longer accessible to a quaternization reaction.

However, it is of course possible to prepare an amino-terminated compound from the reaction of the compound

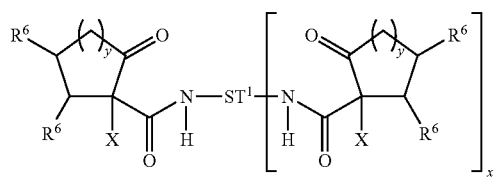

with as excess of the compound

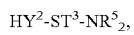

wherein R$^5$ can then also be hydrogen, which is then reacted with the compound

wherein in this case, since the terminal group —NR$^5_2$ is a primary or secondary amino group, a quaternization does not necessarily occur.

Preferably, however, in this variant R$^5$ is not hydrogen, and in particular is alkyl, so that compounds with recurring units of the formula (3)

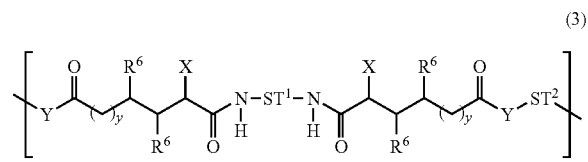

in which the substituents are as defined above, wherein ST$^2$ here forms a radical of the formula

are formed in this manner, so that compounds with the recurring units of the formula (3) are formed with quaternary ammonium groups, i.e. ionic groups, which impart to the compounds, for example, a corresponding hydrophilicity or capacity for adhesion to surfaces.

The radicals Q which are capable of quaternization or, respectively, alkylation of the amino groups are preferably chosen from epoxy groups and haloalkyl groups.

The following example, in which a diepoxy compound is reacted, serves to illustrate the radical ST$^{4V}$:

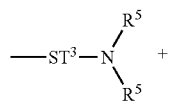

ST$^4$ is thus formed from ST$^{4V}$ and from the molecular parts resulting from the epoxy groups.

In an analogous manner, di(haloalkyl) compounds can be used as the quaternizing compound Q-ST$^{4V}$-Q.

The radicals Q which are capable of alkylation of amino groups are preferably chosen from epoxy groups and haloalkyl groups. Particularly preferred structures containing epoxy groups are the glycidyl structure

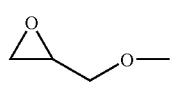

and an epoxy-cyclohexyl structure

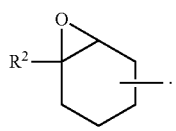

Preferred radicals containing haloalkyl are, in particular, chloropropyl, chloromethyl and chloroalkylcarbonyloxy radicals.

The compounds Q-ST$^{4V}$-Q are chosen, for example, from the group which consists of hydrocarbon-based α,ω-epoxy-functionalized substances. The hydrocarbon-based diepoxide derivatives are preferably
  hydrocarbon diepoxides, for example vinylcyclohexene diepoxide,
  epoxy-terminated polyethers, preferably ethylene oxide- and propylene oxide-based polyethers, for example glycidyl-terminated polyethers,
  epoxy-terminated polyesters, and
  epoxy-terminated polycarbonates.

The compounds Q-ST$^{4V}$-Q are furthermore chosen, for example, from the group which consists of hydrocarbon-based halogen-functionalized substances, preferably chlorides, bromides and hydrocarbon dihalides. They are preferably chosen from the group which consists of:
  halogen-terminated polyethers, preferably ethylene oxide- and propylene oxide-based polyethers,
  halocarboxylic acid esters of hydrocarbon diols and polyethers, preferably ethylene oxide- and propylene oxide-based polyethers, specifically chloroacetic acid esters, chloropropionic acid esters and chlorobutanoic acid esters of hydrocarbon diols and polyethers.

The synthesis of the particularly preferred chlorocarbonic acid esters is carried out in a known manner (Organikum, Organisch-Chemisches Grundpraktikum, 17th edition, VEB Deutscher Verlag der Wissenschaften, Berlin 1988, p. 402-408) by reaction of the diol component with the corresponding halocarboxylic acid anhydrides or halocarboxylic acid chlorides.

They can furthermore be prepared from the corresponding precursors HY-ST$^2$-YH, such as α,ω-hydroxy-functionalized prepolymers, which, in a preferred embodiment, are converted into the corresponding compounds Q-ST$^{4V}$-Q, such as α,ω-halocarboxylic acid esters, specifically chloroacetic acid esters, chloropropionic acid esters and chlorobutanoic acid esters.

In a preferred embodiment of the invention, the introduction of siloxane blocks into the polyamide-polysiloxane compounds according to the invention is carried out via the use of corresponding compounds

Q-ST$^{4V}$-Q containing polysiloxane groups, which are preferably chosen from
- α,ω-epoxy-terminated siloxanes, preferably α,ω-glycidyl- and epoxycyclohexyl-terminated siloxanes,
- α,ω-haloalkyl-terminated siloxanes, preferably chloropropyl- and chloropropenyl-terminated siloxanes
- α,ω-halocarboxylic acid ester-terminated siloxanes, preferably esters of chloroacetic acid, chloropropionic acid and chlorobutanoic acid,
- α,ω-halocarboxylic acid ester-terminated polyether-siloxanes, preferably esters of chloroacetic acid, chloropropionic acid and chlorobutanoic acid.

The preparation of the α,ω-epoxy-terminated siloxanes and α,ω-haloalkyl-terminated siloxanes corresponding to Q-ST$^{4V}$-Q is described in the prior art (Silicone, Chemie und Technologie, Vulkan Verlag Essen 1989, p. 85-90 and 120).

The preparation of α,ω-halocarboxylic acid ester-terminated siloxanes can be carried out analogously to the procedure according to WO 02/10256, Example 1. In this, SiH-siloxanes are reacted with halocarboxylic acid esters of olefinically or acetylenically unsaturated alcohols. The preparation of α,ω-halocarboxylic acid ester-terminated polyether-siloxanes can be carried out analogously to WO 02/10257, Example 1. In this, SiH-siloxanes are reacted with halocarboxylic acid esters of olefinically or acetylenically unsaturated polyethers. Alternatively, it is possible to react α,ω-polyether-siloxanes with halocarboxylic acids or anhydrides or acid chlorides thereof (U.S. Pat. No. 5,650,529 O'Lenick).

The choice of a substance of higher functionality for introduction of ST$^3$ can be utilized in a targeted manner, beyond the aspect of branching/crosslinking, to establish the internal ratio of the structural units ST$^1$:ST$^4$. The use of N,N-bis-(3-dimethylaminopropyl)-N-isopropanolamine thus leads to a ratio of ST$^1$:ST$^4$=1:2, assuming a central N atom which in essence is non-reactive.

The use of N-(3-dimethylaminopropyl)-N,N-diisopropanolamine, on the other hand, leads to a ratio of ST$^1$:ST$^4$=2:1.

The reactions of the blocked ST$^1$-containing prepolymers with the amino- or hydroxy-functional precursors forming ST$^3$ are preferably carried out in the range of from room temperature to 160° C., preferably to 140° C. The reaction times are a few minutes to some hours. The reaction times, the reaction temperatures, the use of catalysts and the conversion achieved depend in particular on the type of amino and hydroxyl groups on the precursors forming ST$^3$. Generally, primary amino groups react more readily than secondary amino groups. The reaction of hydroxyl groups often additionally requires the presence of a catalyst.

It is within the context of the invention optionally to catalyse the reaction of the blocked ST$^1$-containing prepolymers with the amino- or hydroxy-functional precursors forming ST$^3$. Suitable catalysts are e.g. dibutyltin dilaurate, zinc 2-ethylhexanoate and bismuth 2-ethylhexanoate (U.S. Pat. No. 6,827,875).

The invention furthermore relates to the use of the polyamide-polysiloxane compounds according to the invention for the preparation of coatings, agents for modification of surfaces, elastomers, thermosets, adhesives, primers for metal and plastics surfaces, polymer additives, detergent additives, rheological agents, cosmetics and agents for modification of fibres.

In cosmetic formulations for hair, in this context the polyamide-polysiloxane compounds according to the invention can exert in particular the function of so-called conditioning agents ("conditioner"), i.e. in particular favourably influence the properties of hair, such as softness, shine, fullness, combability etc., it also being possible for them to be used, in particular, in combination with other conventional conditioning agents, such as e.g. poly-alpha-olefins, fluorinated oils, fluorinated waxes, fluorinated rubbers, carboxylic acid esters having at least 10 carbon atoms, cationic polymers, silicones which are insoluble or soluble in the medium of the formulation, mineral oils, plant oils and animal oils and mixtures thereof, as described, for example, in WO 99/009939.

The invention furthermore preferably relates to the use of the polyamide-polysiloxane compounds according to the invention for the preparation of coatings or agents for modification of surfaces on hard surfaces, such as, for example, glass, ceramic, tiles, concrete and steel parts, such as automobile bodies and ships' walls/hulls.

The invention furthermore preferably relates to the use of the polyamide-polysiloxane compounds according to the invention for the preparation of primers for bonding silicone elastomers with other substrates, such as steel, aluminium, glass and plastics, such as epoxy resins, polyamides, polyphenylene sulfides and polyesters, such as polyterephthalates.

In a further preferred embodiment of the invention, this relates to the use of the polyamide-polysiloxane compounds according to the invention for the preparation of modifying agents for thermoplastics, such as polyolefines, polyamides, polyurethanes, poly(meth)acrylates and polycarbonates.

In a further preferred embodiment of the invention, this relates to the use of the polyamide-polysiloxane compounds according to the invention for the preparation of low temperature impact modifiers.

In this context, the expression "for the preparation of" as used above also includes the case where the polyamide-polysiloxane compounds according to the invention are used by themselves for the use mentioned. That is to say, for example, the polyamide-polysiloxane compounds according to the invention can be used themselves directly as low temperature impact modifiers. However, they can also be provided suitably beforehand, for example by mixing, compounding or preparation of masterbatches.

The polydiorganosiloxane/urethane copolymers can furthermore preferably be used as a constituent in adhesives and sealants, as a base material for thermoplastic elastomers, such as, for example, cable sheathings, hoses, seals and keyboard mats, and for membranes, such as selectively gas-permeable membranes. A further use of the copolymers according to the invention comprises coatings, such as antifouling and non-stick coatings, fabric-compatible coatings, flame-retardant coatings and biocompatible materials.

These can serves as coating compositions for cosmetics, body care compositions, lacquer additives, an auxiliary substance in detergents, defoamer formulations and textile processing, for modification of resins or for modification of bitumen.

Further uses include packaging material for electronic components, insulation or shielding materials, sealing material in hollow spaces where condensation water forms, such as aircraft, airframes, ships and automobiles, antifogging coatings for floodlight screens (inside), panes for residential buildings, vehicles or medical equipment and additives for polishing, cleaning or care compositions, as an additive for body care compositions, as a coating material for wood, paper and cardboard, as a mould release agent, as a biocompatible material in medical uses, such as contact lenses, as a coating material for textile fibres or textile fabric, as a coating material for natural substances, such as e.g. leather and furs, as a material for membranes and as a material for photoactive systems, e.g. for lithographic processes, optical data protection or optical data transmission.

In a further preferred embodiment of the invention, this relates to the use of the polyamide-polysiloxane compounds according to the invention for the preparation of viscosity regulators, antistatic agents, mixing components for silicone rubbers which can be crosslinked to elastomers peroxidically or by hydrosilylation (platinum catalysis), and there lead to modification of surface properties, modification of the diffusion of gases, liquids etc., or modify the swelling properties of the silicone elastomers, for the preparation of softeners for textile fibres for treatment of the textile fibres before, during and after washing, of agents for modification of natural and synthetic fibres, such as, for example, hair, cotton fibres and synthetic fibres, such as polyester fibres and polyamide fibres and blended fabrics, of textile finishing agents, and of detergent-containing formulations, such as detergents and cleaning compositions.

The present invention furthermore relates to novel detergent formulations, cosmetic formulations and fibre treatment formulations which contain the polyamide-polysiloxane compounds according to the invention.

The polyamide-polysiloxane compounds according to the invention can thus be present, for example, in solid or liquid detergent formulations in contents of from about 0.1 to 10% by wt., based on the total amount of the formulation, and present in cosmetic formulations and fibre treatment formulations, such as textile care compositions, in contents of from about 0.1 to 50% by wt., based on the total amount of the formulation.

Preferably, the polyamide-polysiloxane compounds according to the invention can be employed for treatment and finishing of hard surfaces, such as glass, ceramic, tiles, plastics surfaces, metal surfaces and lacquer surfaces, specifically ship hulls and automobile bodies, quite specifically also in dryer formulations for mechanical washing of automobiles, as adhesives or primers, preferably for bonding silicone elastomers with other substrates, such as steel, aluminium, glass, epoxy resin or polyamide, as modifiers, e.g. low temperature impact modifiers and polarity modifiers, for hydrocarbon-based polymers and silicone-based elastomer systems based on peroxidic and Pt-catalysed crosslinking.

They can furthermore be used for treatment of natural and synthetic fibres, for example cotton, wool and polyester- and polyamide-based synthetic fibres, specifically in the form of textiles, in special compositions for fibre treatment, in particular in detergent formulations containing anionic, nonionic and cationic surfactants, wherein the compounds according to the invention can be incorporated into the detergent directly or can be metered in separately as the washing process runs or after the washing process, and softness, improved elasticity and a reduced tendency to crease are imparted to the substrates treated, while retaining an acceptable hydrophilicity.

They can likewise serve as a constituent of separate softener systems, specifically based on cationic surfactants, after washing of fibres and textiles, as an ironing aid and an agent for preventing or reversing creases in textiles.

They can furthermore be used for finishing fibres, specifically for the first finishing and treatment of, for example, cotton, wool and polyester- and polyamide-based synthetic fibres, specifically in the form of textiles, paper and wood.

As already described, they can furthermore advantageously be employed in cosmetic systems for treatment of hair and skin.

Particularly preferred fields of use for the polyamide-polysiloxane compounds according to the invention are also, preferably aqueous, solutions, mixtures, emulsions and microemulsions, in particular as a base for cosmetic formulations.

The polyamide-polysiloxane compounds according to the invention can be used as a pure substance, solution, mixture, emulsion or microemulsion in the form of liquids, creams or pastes as a starting substance for the preparation of suitable cosmetic formulations according to the invention of various viscosities.

The process for the preparation of formulations of the polyamide-polysiloxane compounds according to the invention, such as, for example, for treatment of substrates, such as hard or soft substrates, can comprise, for example, the following steps:

a) preparation of a premix in the form of solutions, mixtures or emulsions with the polyamide-polysiloxane compounds according to the invention and b) preparation of a further mixture using the premix a) and addition optionally of further surfactants, auxiliary substances and other additives, or c) combination of steps a) and b), in which the mixing of the constituents is carried out with stirrers, dissolvers, kneaders, pumps, mixing screws, mixing nozzles and low and high pressure emulsifying apparatuses.

The processes are realized with the machines and apparatuses known in the art (Ullmann's Enzyklopädie), such as e.g. any form of stirrers in suitable containers, apparatuses or mixing units, as described above.

Direct mixing of all the constituents is possible. However, the preparation of a premix is preferred, since it leads to faster and better distribution and is partly unavoidable, since the various substance groups otherwise cannot be mixed with one another or emulsified or dispersed in a suitable manner, or can be only with a high outlay. Suitable premixes or intermediate mixtures can preferably be mixtures in the form of solutions, pastes, creams or other forms of emulsions or dispersions. The preparation and use of microemulsions of 10 to 200 nm average particle diameter in cosmetic formulations is particularly preferred.

The formulations which contain the polyamide-polysiloxane compounds according to the invention can be prepared, for example, in various presentation forms, such as for hair treatment. Preferably, the compositions containing the polyamide-polysiloxane compounds according to the invention are used as cosmetic formulations for treatment of keratin-containing substrates, such as e.g. human and animal hair or skin, as an alcoholic or polyalcoholic solution or as an emulsion. Depending on the raw materials and auxiliary substances used and the mixing process during the preparation, clear, cloudy and white formulations are obtained.

Alcoholic and polyalcoholic solvents and mixtures thereof with water, oil-like substances and conventional silicones (inter alia polydimethylsiloxanes) and binary and ternary mixtures of solvents and/or oil-like substances and/or silicones are preferably suitable for the preparation of solutions and mixtures which contain the polyamide-polysiloxane compounds according to the invention. Particularly preferred solvents here are ethanol, isopropanol, ethylene glycol and ethylene glycol ethers, polyethylene glycols and ethers thereof, propylene glycol and propylene glycol ethers, polypropylene glycols and ethers thereof and glycerol and mixtures thereof. Particularly preferred oil-like substances are mineral oil products and oils of plant, animal and synthetic origin and mixtures thereof. Particularly preferred silicones, which differ from the polyamide-polysiloxane compounds according to the invention, such as cyclic and linear polydimethylsiloxanes and mixtures thereof, such as e.g. (according to the INCI) cyclomethicone, cyclotetrasiloxane, cyclopentasiloxane, cyclohexasiloxane, dimethicone with a viscosity range of from 0.65 to 60,000,000 mPa·s at 25° C. and dimethiconol with a viscosity range of from 10 to 60,000,000 mPa·s at 25° C.

Preferred solutions and mixtures which contain the polyamide-polysiloxane compounds according to the invention have the following composition in % by wt., based on the total weight of the composition:
Solutions or Mixtures:

| | |
|---|---|
| 0.1-99.9% | polyamide-polysiloxane compounds according to the invention |
| 0.1-99.9% | solvent and/or oil and/or silicones and/or water |

Compositions of the emulsions of the polyamide-polysiloxane compounds according to the invention:

For preparation of the emulsion, water and nonionic, cationic and amphoteric surfactants and surfactant mixtures are generally used. Emulsions can moreover contain auxiliary substances, such as e.g. inorganic and organic acids, bases and buffers, salts, thickeners, stabilizers for emulsions, such as e.g. "xanthan gum", preservatives, foam stabilizers, defoamers and solvents, such as e.g. alcohols (ethanol, isopropanol, ethylene glycol, polyethylene glycol, propylene glycol, polypropylene glycol, glycol ethers and glycerol and mixtures thereof).

The polyamide-polysiloxane compounds according to the invention which are used in the emulsions can also themselves serve as an emulsifier in the preparation of emulsions.

A preferred emulsion which can preferably be used for the preparation of cosmetic formulations comprises, for example, the following constituents in % by wt., based on the total amount of the composition:

| | |
|---|---|
| 10-50% | polyamide-polysiloxane compounds according to the invention, |
| 1-35% | surfactants, |
| 0-10% | auxiliary substances, |
| 0-20% | solvent, |
| to 100% | topped up by water. |

Microemulsions for cosmetic formulations, finishing of textiles and other fibrous substrates or coating of hard surfaces:

The preparation of microemulsions with a high active content of polyamide-polysiloxane compounds according to the invention is particularly preferred, since in addition to the possibility of the preparation of clear cosmetic formulations, these additionally offer the advantage of incorporation into aqueous formulations by simple process technology ("cold process"). There is the possibility of employing the polyamide-polysiloxane compounds according to the invention in the preparation of microemulsions in the form of the solutions and mixtures described above. A preferred active content of the polyamide-polysiloxane compounds according to the invention in the emulsion is between 5 and 60% by wt., and 10-50% by wt. is particularly preferred, based on the total amount of the composition.

A quite specifically preferred microemulsion comprises the following constituents, which do not, however, limit the invention, in % by wt., based on the total amount of the microemulsion:

| | |
|---|---|
| 20-80% | polyamide-polysiloxane compounds according to the invention |
| 0-35% | surfactants |
| 0-10% | auxiliary substances |
| 0-20% | solvent |
| to 100% | topped up by water. |

The invention also provides the use of the solutions, mixtures or emulsions prepared with the polyamide-polysiloxane compounds according to the invention in a cosmetic formulation.

These cosmetic formulations are prepared using the previously prepared solutions or emulsions, but they can also be produced directly from the individual constituents.
Cosmetic Formulations:

Cosmetic formulations include, for example:

So-called "rinse-off" products, such as e.g. "2-in-1" shampoos, "body wash" and hair conditioners for treatment of hair during and after cleansing or after colouring or treatment of hair before bleaching, curling or straightening, and so-called "leave-in" products, such as hair treatments, care creams, hairdressing creams, hair gels, hair styling products, hair setting compositions, hair sprays, pump sprays, blow-waving compositions and blow-drying setting compositions. The formulations moreover likewise include hair colouring compositions, which can be differentiated into 3 types according to the resistance of the colour result achieved to washing—permanent, semipermanent and temporary hair colouring composition. The term hair here includes all keratin-containing fibres, but in particular human hair. The hair colouring compositions contain, for example, conventional silicones, surfactants, auxiliary substances and colouring agents, in addition to the polyamide-polysiloxane compounds according to the invention. Each of these ingredients can be used either by itself or in combination with further ingredients, and represents additional functions in the formulations which serve to increase the volume, the combability and the shine and to reduce washing out of the colour from and out of coloured keratin-containing substrates, such as e.g. human and animal hair, and contain at least one polyamide-polysiloxane compound.

The abbreviations mentioned in connection with the cosmetic formulations are explained in the INCI (The Cosmetic, Toiletry and Fragrance Association, Washington D.C.).

The silicones included here in addition to the polyamide-polysiloxane compounds according to the invention include, for example:

Cyclic, linear and branched polydimethylsiloxanes having a viscosity of 0.65-200,000,000 mPa·s at 25° C. and mixtures thereof, such as e.g. octaorganocyclotetrasiloxanes, octamethylcyclotetrasiloxanes, decaorganocyclo-pentasiloxanes and dodecaorganocyclohexasiloxanes, wherein the organic radical preferably denotes methyl, such as SF 1173, SF 1202, SF 1217, SF 1204 and SF 1258 from GE Bayer Silicones, dimethicones, such as the Baysilone M oils (M3 to M 2,000, 000), SE 30, SF 1214, SF 1236, SF 1276 and CF 1251 from GE Bayer Silicones, and dimethiconols, such as Baysilone from GE Bayer Silicones/Momentive Performance Materials and DC 1501 and DC 1503 from Dow Corning, and high molecular weight polydimethylsiloxanes with terminal SiOH groups.

The use of the polydimethylsiloxanes described above in the form of nonionic, anionic and cationic emulsions, such as e.g. SM 2169, SM 2785, SM 555, SM 2167 and SM 2112 from GE Bayer Silicones/Momentive Performance Materials, in combination with emulsions of the polyamide-polyorganosiloxane compounds according to the invention and/or the use of mixtures and solutions of the polydimethylsiloxanes described above with the polyamide-polysiloxane compounds according to the invention is particularly preferred here, since particular properties of hair care products can be derived from these combinations, such as has already been described extensively in the literature for amino-functional silicones known to date (WO 99/44565, WO 99/44567, WO 99/49836, WO 99/53889, WO 97/12594, U.S. Pat. No. 6,028, 031, EP 0811371, WO 98/18443, WO 98/43599 and US 2002-0182161).

Solid silicones, so-called MQ resins, such as e.g. SR 1000 from GE Bayer Silicones/Momentive Performance Materials, and solutions thereof in solvents, such as the abovementioned silicones and aliphatic solvents, such as e.g. isododecane, are likewise suitable.

Organofunctional silicones, such as alkyl-, aryl-, arylalkyl-, phenyl-, fluoroalkyl- and polyether-modified silicones, such as the types SF 1632, SF 1642, SF 1555, Baysilone CF 1301, Baysilone PK 20, FF 157, SF 1188A, SF 1288 and SF 1388 from GE Bayer Silicones/Momentive Performance Materials, are likewise suitable.

Surfactants:

Surfactants as ingredients of cosmetic formulations are described in A. Domsch: Die kosmetischen Präparate, Verlag für Chem. Industrie, 4th edition, 1992, in Kosmetikjahrbuch 1995, Verlag für chemische Industrie, 1995, and H. Stache, Tensidtaschenbuch, 2nd edition, Carl Hanser Verlag, 1981.

Anionic Surfactants:

By way of example but without being limited thereto, the following anionic surfactants are suitable as a constituent of the formulations:

Alkyl sulfates, alkyl ether-sulfates, alkaryl sulfates, olefinsulfonates, alkylamide ether-sulfates, acyl isethionates, acyl glutamates, alkyl ether-carboxylates, methyl taurides and taurides, sarcosides, sulfosuccinates, protein-fatty acid condensates, alkyl phosphates and alkyl ether-phosphates. The free acids and alkali metal salts and magnesium, ammonium and mono-, di- and triethanolamine salts thereof can be used here.

The alkyl and acyl groups typically contain 8-18 C atoms and can be unsaturated. The alkyl ether-sulfates, alkylamide ether-sulfates, alkyl ether-carboxylates and alkyl ether-phosphates can contain 1-10 ethylene oxide or propylene oxide units or a combination of ethylene oxide and propylene oxide units.

Amphoteric Surfactants:

By way of example but without being limited thereto, the following amphoteric surfactants are suitable as a constituent of the formulations:

Alkylbetaines, alkylamidobetaines, sulfobetaines, acetates and diacetates, imidazolines, propionates and alkylamine oxides.

The alkyl and acyl groups here contain 8-19 C atoms.

Nonionic Surfactants:

By way of example but without being limited thereto, the following nonionic surfactants are suitable as a constituent of the formulations:

Alkyl ethoxylates, aryl ethoxylates, ethoxylated esters, polyglycolamides, polysorbates, glycerol fatty acid ethoxylates, alkylphenol polyglycol ethers and sugar surfactants, such as e.g. alkyl glycosides.

Cationic Surfactants:

In the case of cationic surfactants, a distinction is made between pure cationic surfactants and cationic polymers.

Pure Cationic Surfactants:

By way of example but without being limited thereto, the following nonionic surfactants are suitable as a constituent of the formulations:

Monoalkylquats, dialkylquats, trialkylquats, tetraalkylquats, benzylammonium salts, pyridine salts, alkanolammonium salts, imidazoline salts, oxazoline salts, thiazoline salts, salts of amine oxides and sulfone salts, wherein the term "quat" implies the presence at least of one quaternary ammonium group.

Cationic Polymers:

For "2-in-1" shampoos in particular, cationically modified polymers are also employed, in addition to the pure cationic surfactants. A comprehensive description of these polymers is given in U.S. Pat. No. 5,977,038 and WO 01-41720 A1. Cationic polyacrylamides, cationic protein derivatives, hydroxyalkylcellulose ethers and cationic guar derivatives are preferred here. Cationic guar derivatives with the CTFA name Guar Hydroxypropyltrimonium Chloride are particularly preferred. These types are obtainable under the trade names Cosmedia Guar C 261 (Henkel), Diagum P 5070 (Diamalt) and Jaguar C types and Jaguar EXCEL from Rhodia.

Auxiliary Substances:

Auxiliary substances as ingredients in particular of cosmetic formulations are described in: A. Domsch, Die kosmetischen Präparate, Verlag für Chem. Industrie, 4th edition, 1992; and in: Kosmetikjahrbuch 1995, Verlag für Chemische Industrie, 1995.

By way of example but without being limited thereto, the following auxiliary substances are suitable as a constituent of the formulations:

Inorganic and organic acids, bases and buffers, salts, alcohols, such as e.g. ethanol, isopropanol, ethylene glycol, polyethylene glycol, propylene glycol, polypropylene glycol, glycol ethers and glycerol, thickeners, stabilizers for emulsions, such as e.g. xanthan gum, re-oiling agents, preservatives, foam stabilizers, defoamers, pearlescent and opacifying agents, such as e.g. glycol distearates and titanium dioxide, collagen hydrolysate, keratin hydrolysate, silk hydrolysate, antidandruff active compounds, such as e.g. zinc pyrithione, salicylic acid, selenium disulfide, sulfur and tar preparations, polymeric emulsifiers, vitamins, dyestuffs, UV filters, bentonites, perfume oils, fragrances, styling polymers, moisturizers, plant extracts and further natural or nature-identical raw materials.

It is known that by the addition of oil- and water-soluble UV filters or combinations of UV filters in cosmetic formulations for care and treatment of keratin-containing substrates, such as human and animal hair, the degradation of dyestuffs and therefore the bleaching out and fading of coloured keratin-containing substrates by UV radiation can be reduced decisively or even prevented completely.

Ingredients for Hair Colouring Compositions:

Dyestuffs and other ingredients of hair colouring compositions are described in: A. Domsch, Die kosmetischen Präparate, Verlag für chem. Industrie, 4th edition, 1992. Dyestuffs are described in: Legislation on cosmetic agents (Cosmetics Legislation), Bundesgesetzblatt 1997, part I p. 2412, §3 and annex 3 and in European Community (EC) Directive, 76/68/EEC, annex IV.

In the following, hair colouring compositions are differentiated into permanent, semipermanent and temporary hair colour compositions.

Permanent Hair Colouring Compositions:

Permanent colourings which are not washed out even by washing the hair several times (more than 10) are formed by chemical reaction between dyestuff precursors under oxidative conditions by hydrogen peroxide. The mixture of the corresponding components determines the colour result which can be achieved here.

In the case of the precursors, a distinction is made between oxidation bases (developers) and coupling components (modifiers).

Oxidation Bases:

By way of example but without being limited thereto, the following oxidation bases are suitable as a constituent of the formulations:

m- and p-phenylenediamines (diaminobenzenes), N-substituted derivatives and salts thereof, N-substituted derivatives of o-phenylenediamine, o-, m- and p-toluoylenediamines (methyl-diaminobenzenes), N-substituted derivatives and salts thereof, p-amino-diphenylamine and its hydrochloride and sulfate, o-, m- and p-aminophenol and its hydrochloride, 2,4-diaminoisosulfate (4-methoxy-m-phenylenediamine sulfate), o-chloro-p-phenylenediamine sulfate, picramic acid (2,4-dinitro-6-aminophenol) and 2,4-dinitro-1-naphtholsulfonic acid and the sodium salt thereof.

Coupling Components:

By way of example but without being limited thereto, the following coupling components are suitable as a constituent of the formulations:

Hydroquinone (1,4-dihydroxybenzene), resorcinol (1,3-dihydroxybenzene), pyrocatechol (1,2-dihydroxybenzene), α-naphthol (1-hydroxynaphthalene), pyrogallol (1,2,3-trihydroxybenzene) and 2,6-diaminopyridine.

Oxidation bases and coupling components are conventionally incorporated with surfactants into oil-in-water emulsions, but simple solutions or shampoos are also known as formulations. The formulations moreover contain antioxidants, such as e.g. sodium sulfite, sodium dithionite, ascorbic acid or thioglycollic acid, to stabilize the precursors and are adjusted to a pH of between 8 and 12 (preferably 9-11) with alkaline substances, such as e.g. ammonia. Surfactants as wetting agents, complexing agents for heavy metals, fragrances for masking the ammonia smell, conditioners for improving the feel of the hair and for protecting the hair and solvents, such as ethanol, ethylene glycol, glycerol or benzyl alcohol, are moreover added.

Permanent hair colouring compositions are typically on offer as 2-component systems comprising the colour solution, cream or shampoo described above and the developer solution. The developer solution here contains between 6-12% of hydrogen peroxide, and constituents of the formulation containing the colour components can optionally also be added. The peroxide solution here, however, must be thoroughly stabilized.

Semipermanent Hair Colouring Compositions:

Semipermanent colourings have been developed to maintain the colouring for 6-10 washes with shampoo. So-called direct dyestuffs which essentially belong to the group of nitro, azo and anthraquinone dyestuffs are used here. These dyestuffs are small enough to penetrate into the hair. Formulations which are typically employed are solutions, creams, shampoos or also aerosol foams. The composition is comparable to the formulations containing the colour component which are as permanent hair colourings.

Temporary Hair Colouring Compositions:

In contrast to the semipermanent hair colouring compositions, temporary colourings, also called tints, contain larger dyestuff molecules which are not capable of penetrating into the hair. They have been developed to maintain the colouring for 1-6 washes. Azo and basic dyestuffs and azine and thiazine derivatives are typically employed here. That stated for the semipermanent and permanent hair colouring compositions applies to the composition of the formulations. Dyestuffs and other ingredients of hair colouring compositions are described in: A. Domsch, Die kosmetischen Präparate, Verlag für Chem. Industrie, 4th edition, 1992. Dyestuffs are described in: Legislation on cosmetic agents (Cosmetics Legislation), Bundesgesetzblatt 1997, part I p. 2412, §3 and annex 3 and in European Community (EC) Directive, 76/68/EEC, annex IV.

The following recipes, which do not, however, limit the invention, in which each functional active compound can occur as an individual compound or as a mixture of several compounds have been found to be particularly advantageous for the use of the mixtures containing the polyamide-polysiloxane compounds according to the invention in cosmetic formulations.

A typical shampoo formulation according to the invention, which does not, however, limit the invention, for care and conditioning of hair comprises the following constituents in % by wt., in each case based on the total formulation:

| | |
|---|---|
| 0.01-10% | polyamide-polysiloxane compounds according to the invention |
| 2-15% | anionic surfactant |
| 0-10% | amphoteric surfactant |
| 0-15% | nonionic surfactant |
| 0-10% | cationic surfactant |
| 0-10% | silicone conditioning agent (co-adjuvant) |
| 0-10% | auxiliary substances |
| to 100% | topped up by water. |

A specific shampoo formulation, which does not, however, limit the invention, comprises the following constituents in % by wt.:

| | |
|---|---|
| 0.1-12% | polyamide-polysiloxane compounds according to the invention |
| 1-35% | sodium or ammonium lauryl or laureth sulfate (20-30%) |
| 1-6% | cocoamidopropylbetaine (25-35%) |
| 0-3% | Guar Hydroxypropyltrimonium Chloride |
| 0-5% | polyquaternium-10 |
| 0-12% | silicone conditioning agent (co-adjuvant) |
| 0.01-1% | disodium EDTA |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| 0-2% | sodium chloride |
| to 100% | topped up by water. |

A typical hair conditioner according to the invention, which does not, however, limit the invention, for care and conditioning of hair comprises the following constituents in % by wt.:

| | |
|---|---|
| 0.1-15% | polyamide-polysiloxane compounds according to the invention |
| 0-10% | amphoteric surfactant |
| 0.1-15% | nonionic surfactant |
| 0-10% | cationic surfactant |
| 0-12% | silicone conditioning agent (co-adjuvant) |
| 0-20% | auxiliary substances |
| to 100% | topped up by water. |

A specific composition of a hair conditioner, which does not, however, limit the invention, comprises the following constituents in % by wt.:

| | |
|---|---|
| 0.5-15% | polyamide-polysiloxane compounds according to the invention (as a 43.5% strength emulsion in water with nonionic emulsifiers) |
| 0-15% | silicone conditioning agent (co-adjuvant) |
| 0-10% | cetrimonium chloride (25-35%) |
| 0-3% | Guar Hydroxypropyltrimonium Chloride |
| 1-10% | cetearyl alcohol |
| 0-10% | glycerol |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| to 100% | topped up by water. |

A typical hair care treatment according to the invention, which does not, however, limit the invention, for care and conditioning of hair comprises the following constituents in % by wt.:

| | |
|---|---|
| 0.4-20% | polyamide-polysiloxane compounds according to the invention |
| 0-15% | nonionic surfactant |
| 0-10% | cationic surfactant |
| 0-20% | silicone conditioning agent (co-adjuvant) |
| 0-20% | auxiliary substances |
| to 100% | topped up by water. |

A specific hair care treatment, which does not, however, limit the invention, comprises the following constituents in % by wt.:

| | |
|---|---|
| 1-20% | polyamide-polysiloxane compounds according to the invention (as a 43.5% strength emulsion in water with nonionic emulsifiers) |
| 0.5-10% | stearyl alcohol (and) steareth-7 (and) steareth-10 |
| 0-20% | silicone conditioning agent (co-adjuvant) |
| 0-10% | cetrimonium chloride (25-35%) |
| 0-3% | Guar Hydroxypropyltrimonium Chloride |
| 0-5% | dimethicone |
| 0-5% | paraffin oil |
| 1-10% | stearyl alcohol |
| 0-10% | glycerol |
| 0.01-1% | phenoxyethynol (and) methylparaben (and) butylparaben (and) ethylparaben (and) propylparaben |
| 0-1% | perfume (fragrance) |
| 0-1% | dyestuffs |
| 0-1% | citric acid |
| 0-2% | sodium chloride |
| to 100% | topped up by water. |

A quite specific hair care treatment, which does not, however, limit the invention, comprises the following constituents in % by wt.:

| | |
|---|---|
| 2-5% | polyamide-polysiloxane compounds according to the invention (as a 43.5% strength emulsion in water with nonionic emulsifiers) |
| 0-5% | silicone conditioning agent (co-adjuvant) |
| 0-2% | cetrimonium chloride (25-35%) |
| 0.5-5% | glycerol |
| 0.25-2.5% | propylene glycol |
| 0.05-0.2% | perfume |
| 0.1-0.5% | polysorbate 20 |
| to 100% | topped up by water. |

A typical dyestuffs-containing formulation according to the invention, which does not, however, limit the invention, for temporary, semipermanent or permanent hair colouring, care and conditioning of hair comprises the following constituents in % by wt.:

| | |
|---|---|
| 0.1-10% | polyamide-polysiloxane compounds according to the invention |
| 1-10% | hair dyestuff precursors or dyestuffs according to the desired hair colour |
| 0-15% | anionic surfactant |
| 0-10% | amphoteric surfactant |
| 0-10% | nonionic surfactant |
| 0-10% | cationic surfactant |
| 0-1% | sodium sulfite |
| 0-5% | buffer |
| 0-10% | silicone conditioning agent (co-adjuvant) |
| 0-10% | auxiliary substances |
| to 100% | water. |

A specific colour cream according to the invention, which does not, however, limit the invention, for permanent hair colouring comprises the following constituents in % by wt.:

| | |
|---|---|
| 0.1-10% | polyamide-polysiloxane compounds according to the invention (as a 20% strength emulsion in water with nonionic emulsifiers) |
| 1-5% | hair colour precursors or dyestuffs according to the desired hair colour |
| 2-15% | anionic surfactant |
| 0-10% | amphoteric surfactant |
| 0-10% | nonionic surfactant |
| 0-10% | cationic surfactant |
| 0.1-1% | sodium sulfite |
| 0.1-5% | buffer for pH = 8-12 |
| 0-10% | silicone conditioning agent (co-adjuvant) |
| 0-10% | auxiliary substances |
| to 100% | water. |

A specific colour solution according to the invention, which does not, however, limit the invention, for permanent hair colouring comprises the following constituents in % by wt.:

| | |
|---|---|
| 0.1-10% | polyamide-polysiloxane compounds according to the invention (as a 20% strength emulsion in water with nonionic emulsifiers) |
| 1-5% | hair colour precursors or dyestuffs according to the desired hair colour |
| 0.1-1% | sodium sulfite |
| 5-15% | propylene glycol |
| 5-15% | ammonia (28%) |
| 10-30% | oleic acid |
| 5-15% | isopropanol |
| 10-30% | alkanolamide |
| 0-10% | silicone conditioning agent (co-adjuvant) |
| to 100% | water. |

A typical developer formulation according to the invention, which does not, however, limit the invention, for permanent hair colouring comprises the following constituents in % by wt.:

| | |
|---|---|
| 0.1-10% | polyamide-polysiloxane compounds according to the invention |
| 10-30% | hydrogen peroxide (30%) |
| 0-15% | anionic surfactant |
| 0-10% | amphoteric surfactant |
| 0-10% | nonionic surfactant |
| 0-10% | cationic surfactant |
| 0-5% | buffer or acid for pH = 2-6 |
| 0-10% | silicone conditioning agent (co-adjuvant) |
| 0-10% | auxiliary substances |
| to 100% | water |

A specific developer cream according to the invention, which does not, however, limit the invention, for permanent hair colouring comprises the following constituents in % by wt.:

| | |
|---|---|
| 0.1-5% | polyamide-polysiloxane compounds according to the invention (as a 20% strength emulsion in water with nonionic emulsifiers) |
| 10-30% | hydrogen peroxide (30%) |
| 0-5% | silicone conditioning agent (co-adjuvant) |
| 1-10% | cetearyl alcohol |
| 0.5-5% | trideceth-2 carboxamide MEA |
| 0.5-5% | ceteareth-30 |
| 0.5-5% | glycerol |
| 0.05-2% | pentasodium pentetate (pentasodium diethylenetriaminepentaacetate |
| 0.05-2% | sodium stannate |
| 0.05-2% | tetrasodium pyrophosphate |
| to 100% | water. |

It has been found here that the solutions or mixtures according to the invention are preferably suitable for the preparation of cosmetic formulations, such as for the treatment, conditioning, cleansing and/or care of coloured substrates or substrates which are to be coloured.

That is to say, the formulations containing at least one polyamide-polysiloxane compound according to the invention can be employed in particular for cleansing, care and conditioning of fibrous or flat substrates, and if these are coloured and the colour impression thereof is to be largely retained.

The formulations containing at least one polyamide-polysiloxane compound according to the invention can furthermore serve for the cleansing, care and the treatment and the conditioning of keratin-containing substrates, since they are suitable as cleansing compositions for wool, for waxes and/or increasing the volume and/or the combability and/or the shine and/or for reducing the washing out of the colour from and out of coloured keratin-containing substrates or from keratin-containing substrates which are simultaneously to be coloured, such as e.g. human and animal hair.

The formulations containing at least one polyamide-polysiloxane compound according to the invention can furthermore be used in particular for the cleansing, care and the treatment, cleansing and care of keratin-containing fibres or hair before, during and/or after the colouring operation, since the hair colouring compositions formulated with these lead simultaneously to an improvement in the softness and/or to a reduction in the wet and dry combing forces and/or to an increase in the shine and/or to an increase in the hair volume and/or to a reduction in the washing out of dyestuffs from and out of tinted and dyed hair.

Softener Formulations

With respect to the presentation form, on the one hand it is possible to incorporate the polyamide-polysiloxane compounds according to the invention into non-transparent softener dispersions or softener emulsions or transparent microemulsions or solutions.

Typical further components for such non-transparent or transparent formulations are:
  quaternary ammonium compounds, preferably quaternary ammonium compounds containing alkanoic acid ester units, as softeners,
  organic solvents, preferably mono- and polyhydric alcohols, such as ethanol, 2-propanol, ethylene glycol, 1,2-propylene glycol, hexylene glycol, dipropylene glycol, esters and ethers of glycols and oligoglycols, such as dipropylene glycol monobutyl ether, tripropylene glycol monomethyl ether, diethylene glycol diacetate, to improve the solubility and transparency of the formulation,
  diols and higher alcohols of longer-chain hydrocarbons, for example 2,2,4-trimethyl-1,3-pentanediol, to increase the solubilizability of the softener components,
  nonionic surfactants, preferably alkoxylates of branched or unbranched C8 to C40 alcohols and fatty acid esters of alkylene oxides for stabilizing emulsions or preparation of microemulsions
  perfumes
  viscosity regulators
  dyestuffs
  preservatives.

The additional functional components listed and preferred representatives are known, for example, from U.S. Pat. No. 6,376,455.

On the other hand, it is possible to apply the polysiloxane-polyamide compounds according to the invention to solid carriers in the context of laundry freshener systems, and then to bring these into contact, in the laundry dryer, with textiles which are to be freshened and/or softened. Laundry freshener systems with carriers and functional components thereof are known, for example, from U.S. Pat. No. 4,824,582, U.S. Pat. No. 4,808,086, U.S. Pat. No. 4,756,850, U.S. Pat. No. 4,749,596 and U.S. Pat. No. 3,686,025.

Typical components for such laundry freshener systems with carriers are:
  fatty amines or complexes thereof with anionic surfactants as conditioning agents
  quaternary ammonium compounds, preferably quaternary ammonium compounds containing alkanoic acid ester units, as softeners,
  nonionic softeners, for example based on sorbitan esters or fatty alcohol alkoxylates "soil release agents", for example based on cellulose ethers, guar gum or terephthalic acid block copolymers.

The carrier material is a sponge-like or porous sheet-like material which has a sufficient capacity for uptake of the laundry freshener formulation. "Woven" and "nonwoven" materials are employed. The materials are based on natural or synthetic polymers, such as wool, cotton, sisal, linen, cellulose esters, polyvinyl compounds, polyolefins, polyamides, polyurethanes and polyesters.

The invention furthermore relates to a reactive composition comprising at least one compound of the formula (9)

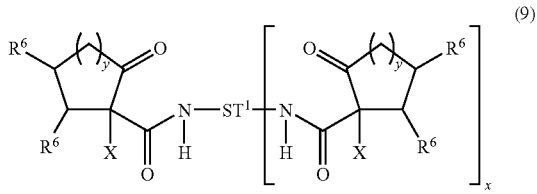

and at least one compound of the formula

wherein x, y, X, Y, $R^6$, $ST^1$ and $ST^2$ are as defined above, with the proviso that at least one of the radicals $ST^1$ and/or $ST^2$ comprises a polysiloxane radical.

The invention furthermore relates to a reactive composition comprising at least one compound of the formula (9)

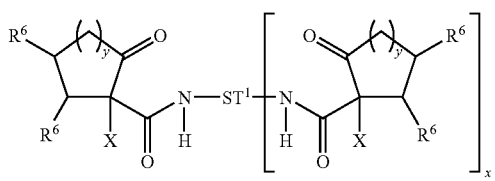

wherein x, y, X, $R^6$ and $ST^1$ are as defined above, at least one compound of the formula

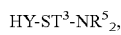

wherein Y, $ST^3$ and $R^5$ are as defined above, and at least one compound of the formula

wherein Q is a radical which is capable of alkylation of an amino group, and $ST^{4V}$, together with the molecular part originating from Q after the quaternization reaction, forms the radical $ST^4$, with the proviso that at least one of the radicals $ST^1$, $ST^3$ and/or $ST^4$ comprises a polyorganosiloxane radical.

The reactive compositions mentioned can be used to cure a cured composition, in particular by heating and/or addition of a catalyst. In this context, the reactive compositions can be employed in particular as a 1C (component) composition or, less preferably, as a 2C (component) composition.

By the curing of the reactive compositions according to the invention, in particular coatings or elastomer shaped articles can be prepared.

The invention furthermore relates to the novel compounds of the formula (9)

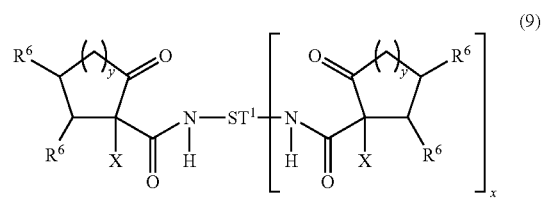

wherein x, y, X, $R^6$ and $ST^1$ are as defined above, with the proviso that the radical $ST^1$ comprises at least one polysiloxane radical, which can be used in the reactive compositions.

By the use of compounds of higher functionality (x>1), branching/crosslinking of the polysiloxane-polyamide compounds takes place. Various use parameters, such as e.g. hardness and elasticity, can be established by this route.

The present invention is illustrated further by the following examples.

EXAMPLES

Example 1

Synthesis of a Hydrocarbon-Based CPEE-Blocked Intermediate 33 g (0.2 mol) of cyclopentanone-2-carboxylic acid ethyl ester (CPEE) and 0.4 g of zinc 2-ethylhexanoate are initially introduced into 51.5 g of butyl acetate at room temperature, while stirring. A mixture of 22.2 g (0.1 mol) of isophoronediisocyanate (IPDI) in 20 g of butyl acetate is added dropwise in the course of 20 minutes. The temperature of the reaction mixture rises to 32° C. The mixture is then heated at 80-90° C. for 10 hours. A clear pale yellow solution in essence of

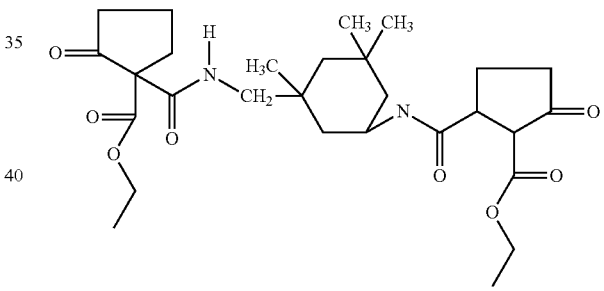

is obtained.

Example 2

Reaction of the CPEE-Blocked Intermediate with an $NH_2$-Terminated Siloxane 20 g of the solution from Example 1 (16.27 mmol of intermediate) are initially introduced into the reaction vessel with 146 g of butyl acetate. 15.2 g (32.54 mmol of $NH_2$ groups, 2.14 mmol of $NH_2$/g of siloxane) of an α,ω-aminopropyl-terminated siloxane of the structure

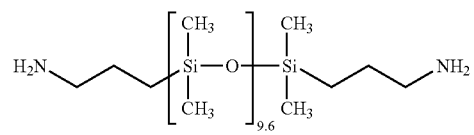

are added dropwise in portions. The temperature of the reaction mixture rises to 45° C. The mixture is then heated at 85-92° C. for 7.5 hours. A highly viscous clear yellow solution is obtained, which contains a polymer with in essence the following structural unit

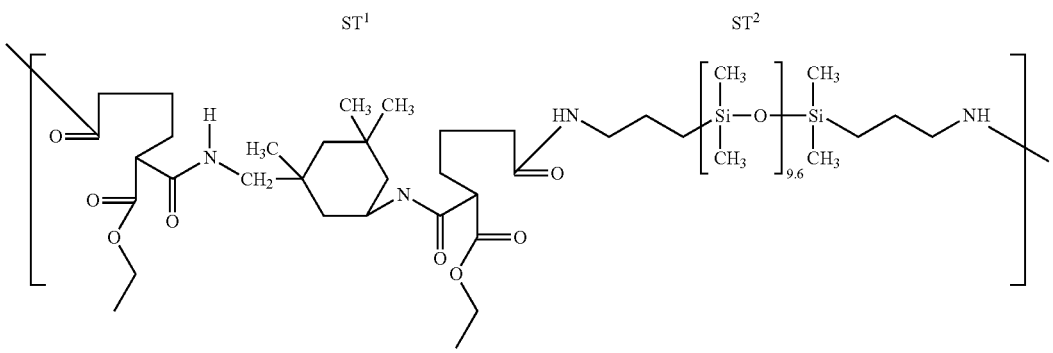

The conversion of the cyclopentanone ring, determined by NMR spectroscopy, is 98%.

After application of a sample of the product to a polycarbonate sheet and evaporation of the solvent in air, a transparent, tough and resilient, non-tacky film is obtained.

Example 3

Reaction of the CPEE-Blocked Intermediate with an NH-Terminated Siloxane 50 g (105 mmol of $NH_2$, 2.14 mmol of $NH_2$/g of siloxane) of an α,ω-aminopropyl-terminated siloxane of the structure

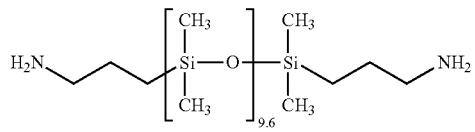

and 12.2 g (105 mmol) of isopropyl glycidyl ether are dissolved in 62.2 g of 2-propanol and the solution is heated at the reflux temperature for 6.5 hours. A pale yellow clear solution is obtained.

38.7 g (32.54 mmol of NH) of this solution are heated at 82-84° C. with 20 g of the solution from Example 1 (16.27 mmol of intermediate) for 9 hours. A clear yellow solution is obtained.

The conversion of the cyclopentanone ring, determined by NMR spectroscopy, is 76%.

After application of a sample of the product to a polycarbonate sheet and evaporation of the solvent in air, a transparent, tough and resilient, still slightly tacky film is obtained.

Example 4

Reaction of the CPEE-Blocked Intermediate with a $CH_2OH$-Terminated Siloxane 35.5 g (16.27 mmol) of a siloxane of the structure

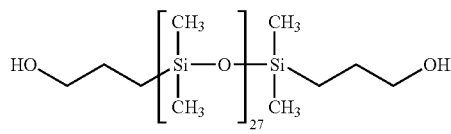

are mixed with 20 g of the solution from Example 1 (16.27 mmol of intermediate), 0.2 g of zinc 2-ethylhexanoate and 33 g of butyl acetate and the mixture is heated at 120° C. for 6 hours. After cooling of the mixture, the slightly cloudy mixture is filtered over a folded paper filter. A viscous yellow solution is obtained.

The conversion of the cyclopentanone ring, determined by NMR spectroscopy, is 42%.

Example 5

Reaction of the CPEE-Blocked Intermediate with a CHOH-Terminated Siloxane 48.8 g (8.13 mmol) of a siloxane of the structure

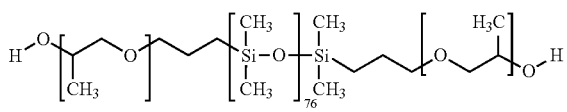

are mixed with 10 g of the solution from Example 1 (8.13 mmol of intermediate), 0.2 g of zinc 2-ethylhexanoate and 47 g of butyl acetate and the mixture is heated at 120° C. for 7.5 hours. After cooling of the mixture, the slightly cloudy mixture is filtered over a folded paper filter. A viscous yellow solution is obtained.

The conversion of the cyclopentanone ring, determined by NMR spectroscopy, is 33%.

Examples 2 to 5 show that amino-terminated siloxanes react with a CPEE-blocked intermediate more easily than hydroxyl-terminated siloxanes.

Primary amines or alcohols in turn react more easily than the corresponding secondary compounds. The reactivity of the overall system can be adapted to specific processing requirements via these stages.

Example 6

Reaction of a CPEE-Blocked Siloxane-Containing Intermediate with an $NH_2$-Terminated Hydrocarbon Structure 22.2 g (0.1 mol) of IPDI are dissolved in 46 g of methoxypropyl acetate at room temperature. A mixture comprising 46.7 g (0.1 mol of $NH_2$ groups) of a siloxane of the structure

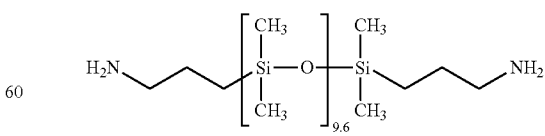

and 23 g of methoxypropyl acetate is added dropwise in the course of one hour. The reaction temperature reaches 40° C. The reaction mixture is heated at 90° C. for 1.5 hours. An isocyanate-terminated siloxane having essentially the structure

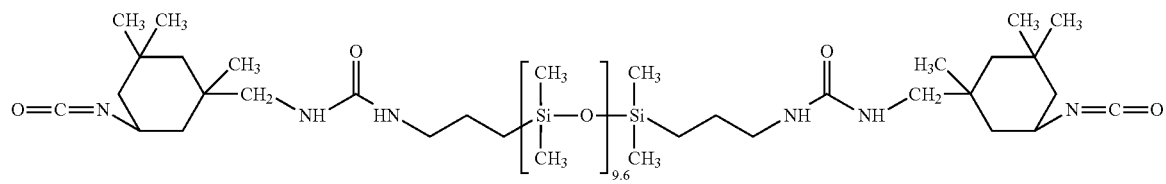

is obtained.

A mixture comprising 15.6 g (0.1 mol) of CPEE, 0.2 g of zinc 2-ethylhexanoate and 15.6 g of methoxypropyl acetate is metered into the reaction solution. The mixture is heated at 95-105° C. for 8 hours.

Finally, 31.65 g (0.05 mol) of Jeffamine ED 600 (Huntsman® Corp.), an NH$_2$-terminated EO/PO polyether of the structure

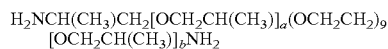

where a+b=3.6
are metered in and the entire mixture is heated at 100° C. for 8 hours. A clear, highly viscous, slightly reddish-coloured product solution is obtained.

After application of a sample of the product to a polycarbonate sheet and evaporation of the solvent in air, a transparent, tough and resilient, non-tacky film is obtained.

Example 7

Synthesis of a siloxane substituted by chloroacetic acid ester units 59.5 g (449 mmol) of CH≡CCH$_2$OC(O)CH$_2$Cl and 0.5 g (containing 1% of Pt) of a vinylsiloxane-modified Pt catalyst are initially introduced into a flask under N$_2$ and at room temperature. 416.5 g (346 mmol of SiH, 0.83 mmol of SiH/g) of an α,ω-SiH-functionalized siloxane are added dropwise in the course of 0.5 hour, the temperature being increased to 130° C. The reaction temperature is maintained for a further 2.5 hours. A volumetric determination of the residual content of SiH shows a conversion of 98.5%.

After removal of all the components which have a boiling point of up to 130° C./1 mm Hg, a product is obtained which, according to NMR analysis, has the structure

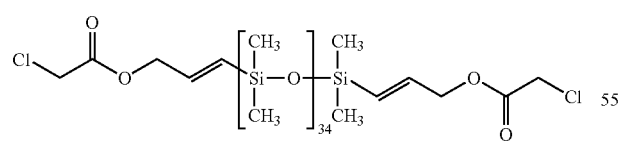

The ratio of addition in the 1 position:2 position is 78:22.

Example 8

Synthesis of a Hydrocarbon-Based CPEE-Blocked Intermediate 33 g (0.2 mol) of cyclopentanone-2-carboxylic acid ethyl ester (CPEE) and 0.4 g of zinc 2-ethylhexanoate are initially introduced into 51.5 g of butyl acetate at room temperature, while stirring. A mixture of 22.2 g (0.1 mol) of isophoronediisocyanate (IPDI) in 20 g of butyl acetate is added dropwise in the course of 20 minutes. The temperature of the reaction mixture rises to 32° C. The mixture is then heated at 80-90° C. for 10 hours. A clear pale yellow solution of

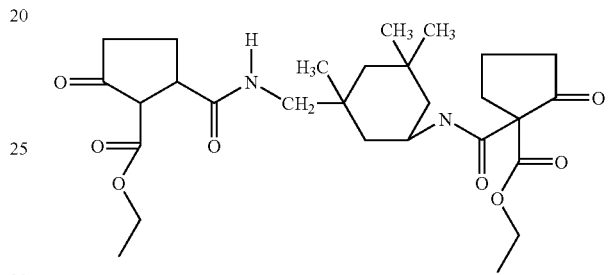

is obtained.

Example 9

Reaction of the CPEE-Blocked Intermediate from Example 8 to Give a Siloxane-Quat 23 g of the solution from Example 2 (18.7 mmol of intermediate), 3.8 g (7.4 mmol) of (CH$_3$)$_2$NCH$_2$CH$_2$CH$_2$NH$_2$, 0.2 g of zinc 2-ethylhexanoate and 54 g of 2-propanol are mixed with one another at room temperature, the temperature rising to 45° C. The mixture is heated at 82-84° C. for 1 hour.

A mixture comprising 54 g of 2-propanol and 53.2 g (18.7 mmol) of the siloxane derivative according to Example 1

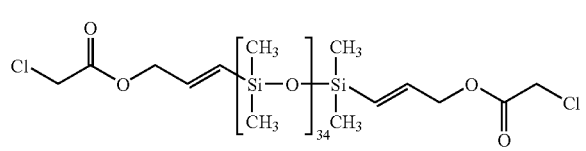

is then added and the entire mixture is heated at 82-84° C. for 12 hours.

A viscous, dark red solution is obtained, which contains a polymer with the structural elements

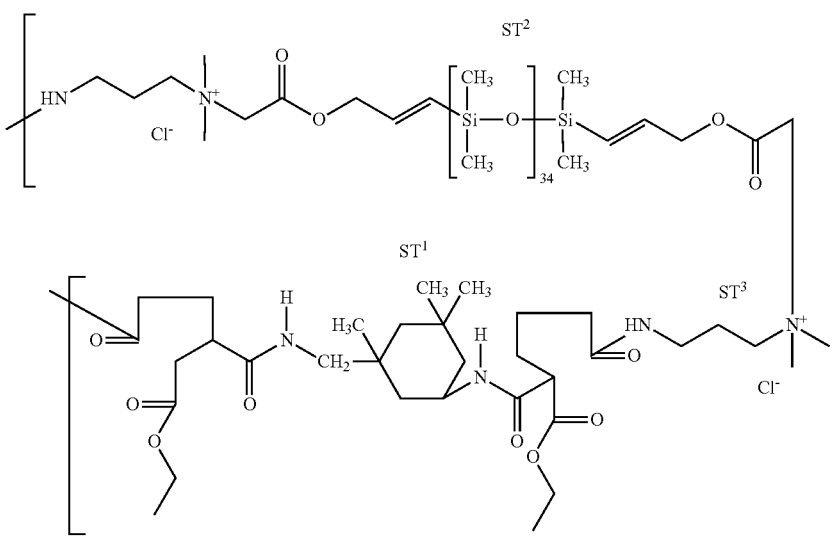

The invention claimed is:

1. A polyamide-polysiloxane compound containing at least one selected from the group consisting of
(A) a structural element of formula (3)
(B) an acid addition compound of formula (3) and
(C) a salt of formula (3):

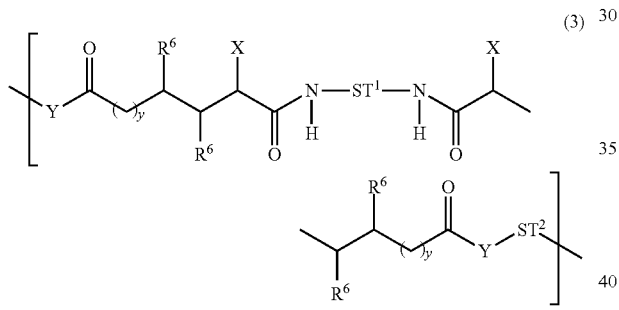

(3)

wherein
X is an electron-attracting group,
the radicals $R^6$ can be identical or different and are selected from the group consisting of hydrogen and straight-chain, cyclic or branched, saturated, unsaturated or aromatic hydrocarbon radicals having up to 40 carbon atoms, wherein $R^6$ optionally further comprises one or more groups selected from the group consisting of —O—, —C(O)—, —NH— and —$NR^3$—, wherein $R^3$ is a straight-chain, cyclic or branched, saturated, unsaturated or aromatic hydrocarbon radical having up to 40 carbon atoms, wherein $R^3$ may optionally further comprises one or more groups selected from the group consisting of —O—, —C(O)— and —NH—, and
$ST^1$ is a divalent, trivalent or tetravalent, straight-chain, cyclic or branched, saturated, unsaturated or aromatic hydrocarbon radical having up to 1,000 carbon atoms, wherein $ST^1$ optionally further comprises one or more groups selected from the group consisting of —O—, —C(O)—, —NH—, —$NR^3$— and a polysiloxane unit having 2 to 1,000 silicon atoms,
subscript y is from 0 to 5, and
subscript x is chosen from 1 to 3, and wherein
(A) Y is selected from the group consisting of —O—, —S— and —$NR^2$—, wherein $R^2$ is hydrogen or a straight-chain, cyclic or branched, saturated, unsaturated or aromatic hydrocarbon radical having up to 40 carbon atoms, wherein $R^2$ optionally further comprises one or more groups chosen from —O—, —C(O)—, —NH— and —$NR^3$—, $ST^2$ is a straight-chain, cyclic or branched, saturated, unsaturated or aromatic hydrocarbon radical having up to 1,000 carbon atoms, which can contain one or more groups chosen from —O—, —C(O)—, —NH—, —$NR^3$—,

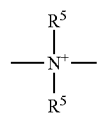

and a polysiloxane unit having 2 to 1,000 silicon atoms, wherein (i) $R^5$ is a straight-chain, cyclic or branched, saturated, unsaturated or aromatic hydrocarbon radical having up to 100 carbon atoms, optionally further comprising one or more groups selected from the group consisting of —O—, —C(O)— and —NH—, or (ii) $R^5$ is a divalent radical which forms cyclic structures within the radical $ST^2$, (B) Y is nitrogen and forms a heterocyclic structure together with $ST^2$ with the provisos that at least one of the radicals $ST^1$ and $ST^2$ comprises a polysiloxane radical and that neither $ST^1$ nor $ST^2$ includes a urethane linkage and $ST^2$ excludes a urea group.

2. The polyamide-polysiloxane compound of claim 1, which is linear or branched, or acid addition compounds thereof.

3. The polyamide-polysiloxane compound of claim 1, further comprising at least one polysiloxane structural element of the formula (2):

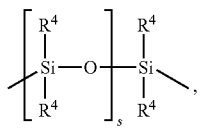

(2)

wherein

R⁴ is a straight-chain, cyclic or branched, saturated, unsaturated or aromatic hydrocarbon radical having up to 20 carbon atoms, and subscript s is 1 to 999.

4. The polyamide-polysiloxane compound of claim 1, where the compound includes at least two structural elements of formula (3).

5. The polyamide-polysiloxane compound of claim 3, wherein the compound includes at least two polysiloxane structural elements of formula (2).

6. The polyamide-polysiloxane compound of claim 3, wherein X is represented by —Z—R¹, wherein R¹ is a straight-chain, cyclic or branched, saturated, unsaturated or aromatic hydrocarbon radical having up to 40 carbon atoms, wherein R¹ optionally further comprises one or more groups chosen from —O—, —C(O)—, —NH— and —NR³, and wherein Z is selected from the group consisting of —C(O)—O—, —SO₂—, —NO₂, —P(O)(OR⁴)₂, —CN, —NC, and —C(O)—.

7. The polyamide-polysiloxane compound of claim 6, wherein X represents an ester radical of the formula —C(O)—O—R¹.

8. The polyamide-polysiloxane of claim 1, wherein X is selected from the group consisting of a carboxylic acid methyl ester group and a carboxylic acid ethyl ester group.

9. The polyamide-polysiloxane compound of claim 1, wherein R⁶ is hydrogen.

10. The polyamide-polysiloxane compound of claim 1, wherein x is 1.

11. The polyamide-polysiloxane compound of claim 1, further comprising at least one selected from the group consisting of amino groups, protonated amino groups and quaternary ammonium groups.

12. The polyamide-polysiloxane compound of claim 1, comprising recurring units of at least one of formula (4), formula (5), formula (6) and formula (7):

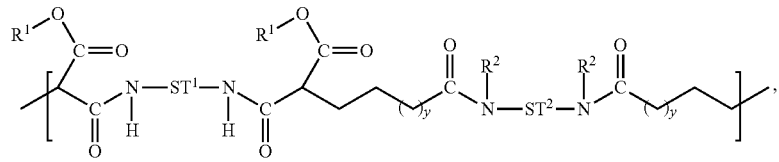

(4)

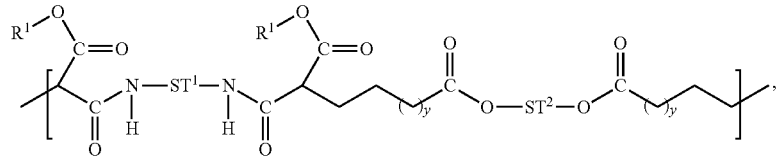

(5)

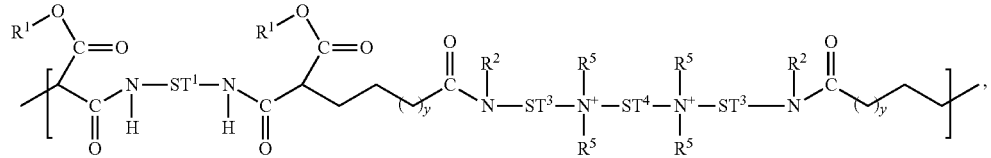

(6)

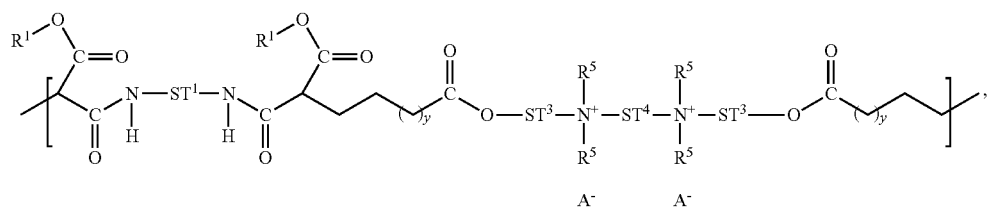

(7)

wherein R¹ is a straight-chain, cyclic or branched, saturated, unsaturated or aromatic hydrocarbon radical having up to 40 carbon atoms, which can contain wherein R¹ optionally further comprises one or more groups chosen from —O—, —C(O)—, —NH— and —NR³, wherein R³ is as defined above, and wherein Z is chosen from selected from the group consisting of —C(O)—O—, —SO₂—, —NO₂, —P(O)(OR⁴)₂, —CN, —NC, and —C(O)—, ST³ is a straight-chain, cyclic or branched, saturated, unsaturated or aromatic hydrocarbon radical having 2 to 100 carbon atoms, wherein ST3 optionally further comprises one or more groups selected from the group consisting of —O—, —C(O)—, —NH— and —NR³—, ST⁴ is a straight-chain, cyclic or branched, saturated, unsaturated or aromatic hydrocarbon radical having up to 1,000 carbon atoms, wherein ST4 optionally further comprises one or more groups selected from the group consisting of —O—, —C(O)—, —NH—, —NR³— and a polysiloxane unit having 2 to 1,000 silicon atoms, and A⁻ is an inorganic or organic anion.

13. The polyamide-polysiloxane compound of claim 12, wherein at lease one of the following definitions applies:

(a) ST$^1$ is a divalent straight-chain, cyclic or branched, polyvalent, saturated, unsaturated or aromatic hydrocarbon radical having up to 200 carbon atoms, which can contain one or more groups chosen from —O—, —C(O)—, —NH—, —NR$^3$— and a polysiloxane unit having 2 to 200 silicon atoms, (b) ST$^2$ is a divalent straight-chain, cyclic or branched, polyvalent, saturated, unsaturated or aromatic hydrocarbon radical having up to 200 carbon atoms, which can contain one or more groups chosen from —O—, —C(O)—, —NH—, —NR$^3$—,

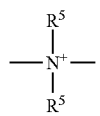

and a polysiloxane unit having 2 to 200 silicon atoms, (c) R$^2$ is H or a straight-chain, cyclic or branched, saturated, unsaturated or aromatic hydrocarbon radical having up to 10 carbon atoms, which can contain one or more groups chosen from —O—, —C(O)—, —NH— and —NR$^3$—, (d) subscript y is 0 to 3, (e) ST$^4$ is a divalent, straight-chain, cyclic or branched, polyvalent, saturated, unsaturated or aromatic hydrocarbon radical having up to 200 carbon atoms, which can contain one or more groups chosen from —O—, —C(O)—, —NH—, —NR$^3$— and a polysiloxane unit having 2 to 200 silicon atoms, (f) ST$^3$ is a straight-chain, cyclic or branched, polyvalent saturated, unsaturated or aromatic hydrocarbon radical having 2 to 20 carbon atoms, which can contain one or more groups chosen from —O—, —C(O)—, —NH— and —NR$^3$—, (g) R$^3$ is a straight-chain, cyclic or branched, saturated, unsaturated or aromatic hydrocarbon radical having up to 10 carbon atoms, which can contain one or more groups chosen from —O—, —C(O)— and —NH—, (h) R$^4$ is a straight-chain, cyclic or branched, saturated, unsaturated or aromatic hydrocarbon radical having up to 9 C atoms, (i) subscript s is 1 to 199, (j) R$^5$ is a straight-chain, cyclic or branched, saturated, unsaturated or aromatic hydrocarbon radical having up to 25 carbon atoms, which can contain one or more groups chosen from —O—, —C(O)— and —NH—, or R$^5$ is a divalent radical which forms cyclic structures within the radical ST$^2$, (k) R$^6$ is hydrogen, (l) A$^-$ is selected from the group consisting of chloride, bromide, sulfate, phosphate, carboxylate, alkyl sulfate and sulfonate.

14. The polyamide-polysiloxane compound of claim 13, wherein ST$^1$ is selected from the group consisting of:

(a) divalent, straight-chain hydrocarbon radicals having up to 15 carbon atoms, (b) divalent, cyclic hydrocarbon radicals having up to 15 carbon atoms, (c) divalent, aromatic hydrocarbon radicals having up to 15 carbon atoms.

15. Detergent formulations, cosmetic formulations and fiber treatment formulations containing at least one polyamide-polysiloxane compound according to claim 1.

16. A coated composition obtained by forming a bond between a silicone elastomer and a second substrate selected from the group consisting of steel, aluminum, plastics, epoxy resins, polyamides, polyphenylene sulfides, polyesters, polyterephthalates, by a process comprising applying the composition of claim 1 to at least one of the silicone elastomer and the substrate, and bringing the silicone elastomer and the substrate into contact with one another.

17. Polyamide-polysiloxane compounds of claim 1 obtained by curing a reactive composition containing at least one compound of the formula:

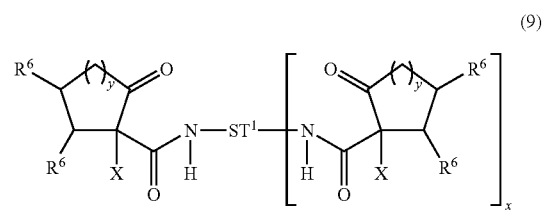

and at least one compound of the formula

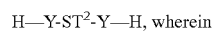

subscript x is from 1 to 3, subscript y is from 0 to 5,

X is an electron-attracting group, the radicals R$^6$ can be identical or different and are selected from the group consisting of hydrogen and straight-chain, cyclic or branched, saturated, unsaturated or aromatic hydrocarbon radicals having up to 40 carbon atoms, wherein R$^6$ optionally further comprises one or more groups selected from the group consisting of —O—, —C(O)—, —NH— and —NR$^3$—, wherein R$^3$ is a straight-chain, cyclic or branched, saturated, unsaturated or aromatic hydrocarbon radical having up to 40 carbon atoms, wherein R$^3$ may optionally further comprises one or more groups selected from the group consisting of —O—, —C(O)— and —NH—, ST$^1$ is a divalent, trivalent or tetravalent, straight-chain, cyclic or branched, saturated, unsaturated or aromatic hydrocarbon radical having up to 1,000 carbon atoms, wherein ST$^1$ optionally further comprises one or more groups selected from the group consisting of —O—, —C(O)—, —NH—, —NR$^3$— and a polysiloxane unit having 2 to 1,000 silicon atoms, and either (A) Y is selected from the group consisting of —O—, —S— and —NR$^2$—, wherein R$^2$ is hydrogen or a straight-chain, cyclic or branched, saturated, unsaturated or aromatic hydrocarbon radical having up to 40 carbon atoms, wherein R$^2$ optionally further comprises one or more groups chosen from —O—, —C(O)—, —NH— and —NR$^3$—, ST$^2$ is a straight-chain, cyclic or branched, saturated, unsaturated or aromatic hydrocarbon radical having up to 1,000 carbon atoms, which can contain one or more groups chosen from —O—, —C(O)—, —NH—, —NR$^3$—,

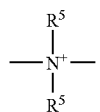

and a polysiloxane unit having 2 to 1,000 silicon atoms, wherein
(i) $R^5$ is a straight-chain, cyclic or branched, saturated, unsaturated or aromatic hydrocarbon radical having up to 100 carbon atoms, optionally further comprising one or more groups selected from the group consisting of —O—, —C(O)— and —NH—, or
(ii) $R^5$ is a divalent radical which forms cyclic structures within the radical $ST^2$, or (B) Y is nitrogen and forms a heterocyclic structure together with $ST^2$, with the provisos that at least one of the radicals $ST^1$ and $ST^2$ comprises a polysiloxane radical and that neither $ST^1$ nor $ST^2$ includes a urethane linkage and $ST^2$ excludes a urea group.

* * * * *